(12) United States Patent
Groft et al.

(10) Patent No.: US 6,441,352 B1
(45) Date of Patent: Aug. 27, 2002

(54) APPARATUS FOR ELECTRICALLY HEAT WELDING THERMOPLASTIC FITTINGS AND METHOD OF USING THE SAME

(75) Inventors: William E. Groft, Landenberg, PA (US); David W. Groft, Wilmington; Michael W. Groft, New Castle, both of DE (US)

(73) Assignee: EF Technologies, Inc., Newark, DE (US)

( * ) Notice: Subject to any disclaimer, the term of this patent is extended or adjusted under 35 U.S.C. 154(b) by 0 days.

(21) Appl. No.: 09/585,179

(22) Filed: Jun. 1, 2000

Related U.S. Application Data

(60) Provisional application No. 60/174,552, filed on Jan. 5, 2000.

(51) Int. Cl.[7] .................................................. H05B 1/02
(52) U.S. Cl. ..................... 219/535; 219/488; 156/304.2; 156/274.2
(58) Field of Search ................................ 219/535, 544, 219/497, 488; 156/304.2, 274.2, 273.9, 379.7

(56) References Cited

U.S. PATENT DOCUMENTS

| | | | | |
|---|---|---|---|---|
| 3,564,204 A | * | 2/1971 | Mense ......................... | 219/497 |
| 3,703,624 A | * | 11/1972 | Simsack ...................... | 219/229 |
| 4,147,926 A | | 4/1979 | Stähli | |
| 4,300,087 A | * | 11/1981 | Meisner ...................... | 320/112 |
| 4,349,219 A | | 9/1982 | Sturm | |
| 4,486,650 A | * | 12/1984 | Bridgstock et al. ......... | 219/544 |
| 4,571,488 A | * | 2/1986 | Reeves ........................ | 219/544 |
| 4,602,148 A | * | 7/1986 | Ramsey ...................... | 219/535 |
| 4,616,660 A | * | 10/1986 | Johns .......................... | 128/741 |
| 4,642,155 A | | 2/1987 | Ramsey | |
| 4,684,789 A | | 8/1987 | Eggleston | |
| 4,795,877 A | | 1/1989 | Bridgstock et al. | |
| 4,837,424 A | | 6/1989 | Nussbaum et al. | |
| 4,852,914 A | | 8/1989 | Lyall | |
| 4,999,545 A | * | 3/1991 | Summer ...................... | 315/219 |
| 5,111,127 A | * | 5/1992 | Johnson ....................... | 320/2 |
| 5,130,518 A | * | 7/1992 | Merle ......................... | 219/497 |
| 5,170,040 A | * | 12/1992 | Wirtz et al. ................. | 219/497 |
| 5,170,042 A | * | 12/1992 | Bunn .......................... | 219/497 |
| 5,620,625 A | * | 4/1997 | Sauron et al. .............. | 219/494 |
| 5,639,394 A | | 6/1997 | Conley | |
| 5,670,012 A | * | 9/1997 | Porfido et al. ........... | 156/379.7 |
| 5,788,789 A | * | 8/1998 | Cooper ....................... | 219/241 |
| 5,908,575 A | | 6/1999 | Smith et al. | |
| 5,911,895 A | * | 6/1999 | Porfido et al. .............. | 219/221 |
| 5,951,902 A | | 9/1999 | Goodman et al. | |

FOREIGN PATENT DOCUMENTS

| | | | |
|---|---|---|---|
| DE | 29909348 | * | 8/1999 |
| EP | 879 666 | | 11/1998 |
| JP | 63-160820 | * | 7/1988 |
| JP | 2-14129 | * | 1/1990 |
| JP | 7-325635 | * | 12/1995 |
| JP | 10-301646 | * | 11/1998 |

* cited by examiner

*Primary Examiner*—John A. Jeffery
(74) *Attorney, Agent, or Firm*—Connolly Bove Lodge & Hutz LLP

(57) ABSTRACT

A method and apparatus for electrically heat welding a thermoplastic electrofusion fitting having an electrically resistive element disposed therein, whereby a regulated quantity of electric power is supplied to the resistive element during the welding process and the making of a high quality weld is ensured. In accordance with the method, electric power is supplied to the resistive element of the fitting. The resistance of the electrically resistive element is measured with low voltage electric power, and the size of the fitting to be welded is determined from a data table that can be loaded and modified by the user and sorted according to previously-fused fittings. The method includes the steps of generating a alternating current voltage from a direct current power supply and transmitting the alternating current voltage to the electrically resistive element. The method also includes a method of fitting identification based upon a comparison of the resistance of the resistive element with information stored in the data table.

20 Claims, 21 Drawing Sheets

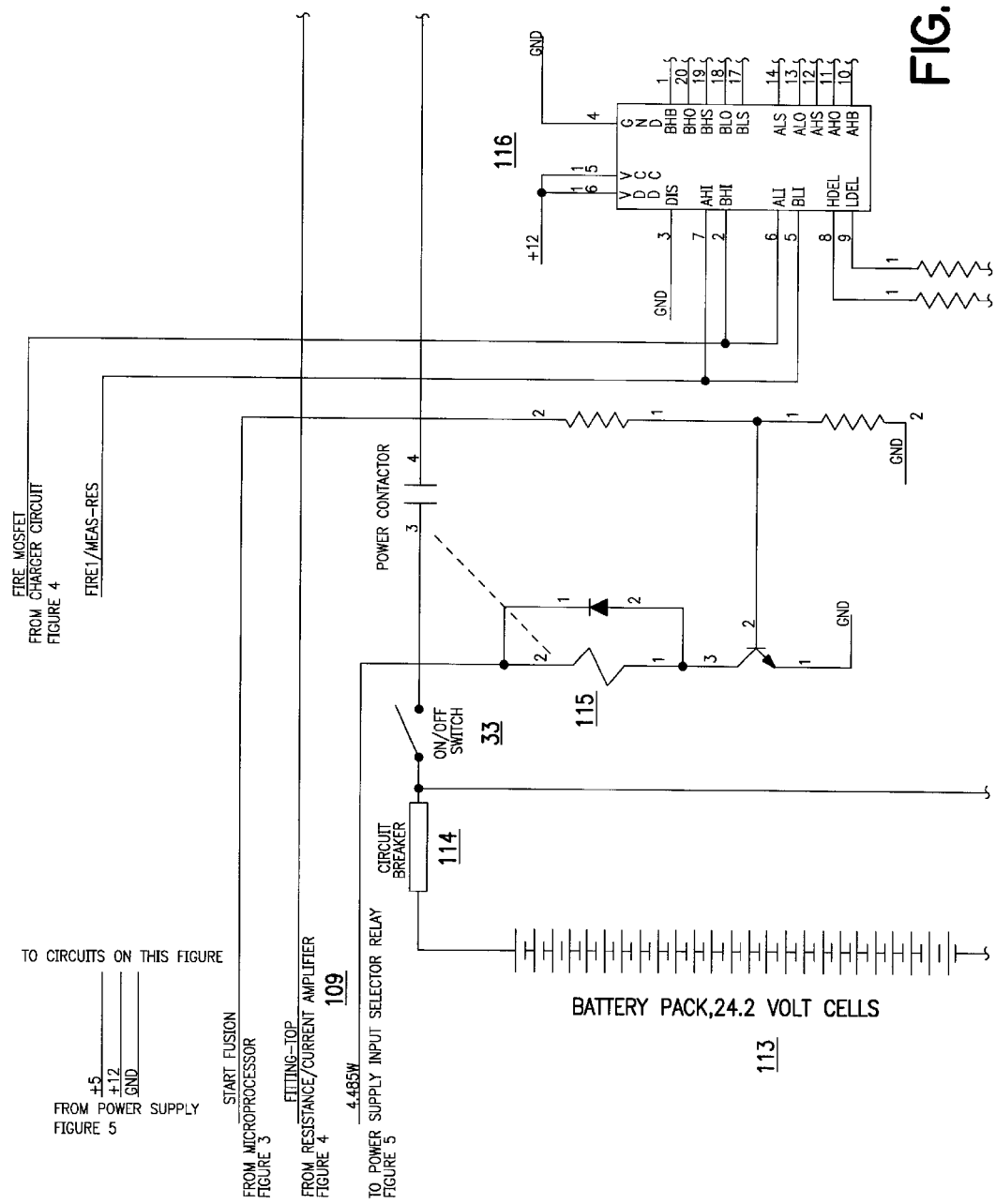

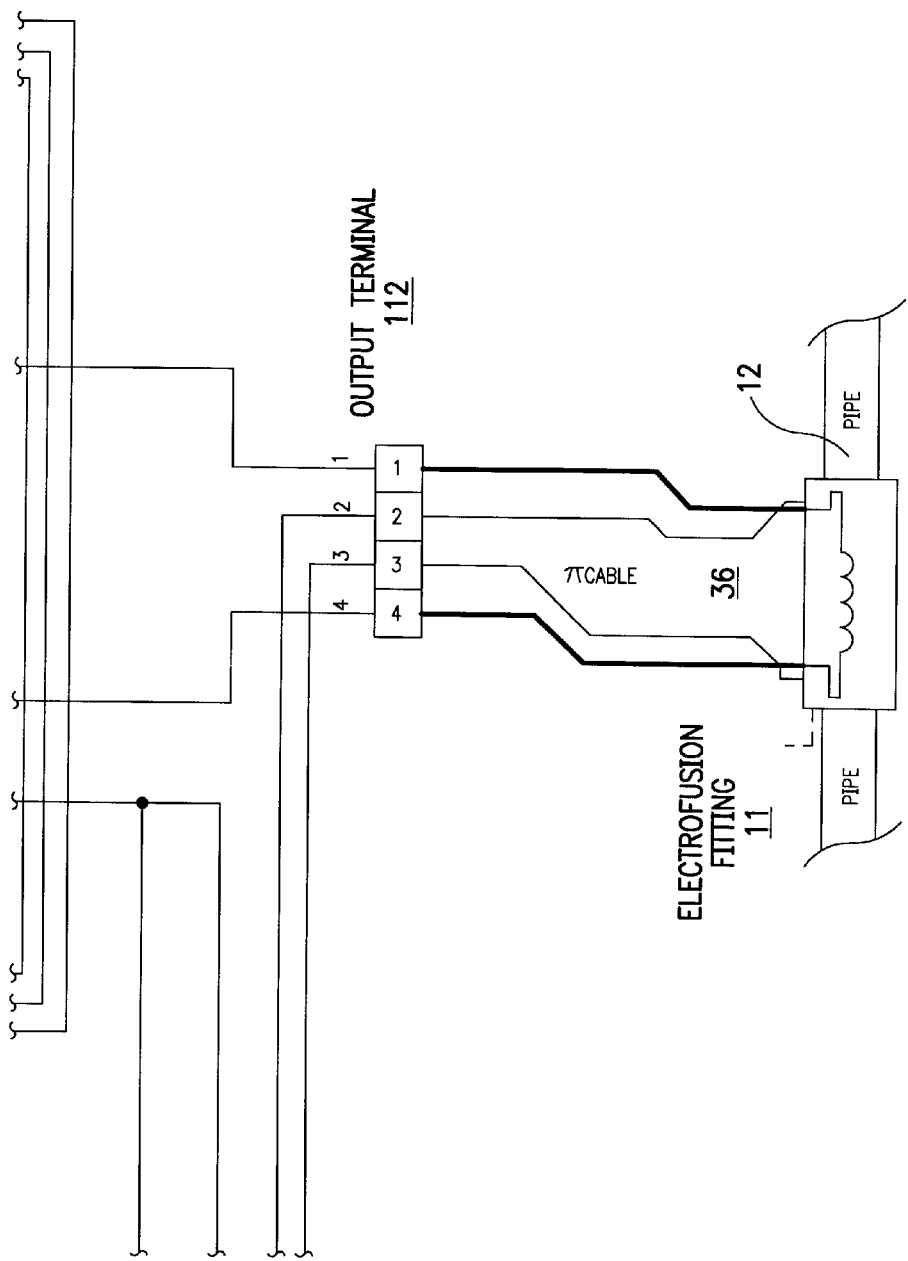

APPARATUS FOR ELECTRICALLY HEAT WELDING THERMOPLASTIC FITTINGS AND METHOD OF USING THE SAME

This application claims priority from Provisional application Ser. No. 60/174,552, filed Jan. 5, 2000.

BACKGROUND OF THE INVENTION

A. Field of the Invention

The present invention relates generally to a method and apparatus for electrically heat welding of thermoplastic fittings, and, more particularly, to an alternating current (AC) battery-powered apparatus for electrically heat welding of thermoplastic fittings, and method of using the same.

B. Description of the Related Art

Electric heat-weldable fittings (also known as electrofusion fittings) formed of thermoplastic materials have been developed and used heretofore. Such fittings generally include an electrically resistant heating coil or element positioned adjacent the inside surfaces of the fitting which are to be welded to one or more other thermoplastic members, such as plastic pipe sections. The electrically resistant heating element typically comprises a coil of resistance wire disposed in the thermoplastic material of the fitting, and connects to electric contacts attached to an outside surface of the fitting. Examples of such electric heat weldable thermoplastic fittings are described in U.S. Pat. Nos. 4,147,926 and 4,349,219.

Electrofusing is an effective method of installing branch connections or tapping into a main gas pipeline. Many vendors supply electrofusion fittings, wherein each of the fittings has a particular fusion voltage and fusion time. Many of the vendors have a proprietary method for identifying the fitting to be fused or for controlling the fusion process parameters such as time and voltage applied to the fitting, forcing a user to purchase a dedicated fusion system as well as the fittings from the vendor. This marketing method prohibits the user from purchasing electrofusion fittings competitively from all suppliers.

A method of identifying the electrofusion fitting and setting the correct fusion voltage and time is described in U.S. Pat. No. 4,837,424. This method allows the user to purchase electrofusion fittings competitively from all suppliers. A conventional electrofusion system 1 utilizing this method is shown in FIG. 1. In the conventional system, an electrofusion fitting 2 contains electrically resistive elements 3 embedded near the surface of the fitting. Power is supplied from a gasoline engine-powered AC generator or a battery-powered inverter 4. The system converts this power to a fixed AC voltage and supplies the fixed AC voltage to electrofusion fitting 2 through a pair of wires 5. A barcode wand or magnetic card reader 6 is used to scan machine readable data regarding fitting 2. This data is used to program the electrofusion system 1 with the proper fusion time and output voltage. When the user starts the fusion, an AC voltage is supplied to resistive element 3 in electrofusion fitting 2. Resistive element 3 generates heat, and the molten plastic then fuses and permanently joins electrofusion fitting 2 to a pipe 7, forming a leak tight joint. When the fusion time expires, electrofusion system 1 stops the AC voltage and terminates the fusion. Data from the fusion, including, an electrofusion system serial number, fusion number, fusion date and time, fitting manufacturer, fitting type, fitting size, ambient temperature, fusion voltage, nominal fusion time, adjusted fusion time (compensated for ambient temperature), actual time fused, fusion result, operator, location, and an information field, is stored in the internal memory of electrofusion system 1, along with the fusion mode, i.e. barcode or manual mode. This data may be downloaded at a later time to provide complete fusion traceability.

Conventional electrofusion system 1 is also equipped with systems to monitor the performance of the fusion as it progresses, and to terminate the fusion if abnormalities are found. Abnormalities include, but are not limited to, shorts in the fitting, low or high output voltage, insufficient supply voltage, disconnection of the fitting during fusion, or stoppage of the fusion by the user. The absence of errors indicates that the fusion was done properly. This system and method suffers from several problems. For example, this fusion system must be equipped with a barcode or magnetic card reader, devices which are not reliable in the field and which inconvenience the user when they fail.

Another conventional electrofusion system and method, described in U.S. Pat. No. 5,951,902, is powered by a direct current (DC) power source and supplies a direct current voltage output to the resistive element. This system also suffers from a variety of problems. For example, the DC voltage does not vibrate the fitting like the magnetic fields generated by an AC voltage (as described in U.S. Pat. No. 4,684,789). Since all electrofusion fittings are tested for proper performance and certified with an AC voltage, the electrofusion fittings may have to be re-characterized and certified with a DC voltage if the system of U.S. Pat. No. 5,951,902 is used. Another problem with this system is that fusion can begin even when there is insufficient energy in the battery to complete the fusion. This reduces the economic viability of electrofusion because the incomplete fusion must be replaced, and increases the possibility that an operator may not replace the faulty joint, resulting in a potentially lethal situation of a natural gas leak. Still another problem with this system is the lack of data storage available for traceability. This prevents analysis of fusion data to determine whether all fusions were completed without errors.

SUMMARY OF THE INVENTION

An object of the invention is to provide an apparatus and method for creating an electrofusion between thermoplastic members that overcomes the problems set forth above with respect to the related art.

A further object of the invention is to provide an easy to use apparatus and method that ensures safe, effective electrofusion between thermoplastic members.

Additional objects and advantages of the invention will be set forth in part in the description which follows, and in part will be learned from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method for creating an electrofusion between a plurality of thermoplastic members, wherein at least one of the members has an electrically resistive element embedded therein, the method including the steps of: generating an alternating current voltage from a direct current power supply; transmitting the alternating current voltage to the electrically resistive element; and regulating the alternating current voltage transmitted to the electrically resistive element at a predetermined alternating current voltage.

To further achieve the objects, the present invention comprises an apparatus for creating an electrofusion between a plurality of thermoplastic members, wherein at least one of the members has an electrically resistive element embedded therein, the apparatus comprising: a direct current power supply; means for generating an alternating current voltage from the power supplied by the power supply; means for transmitting the alternating current voltage to the electrically resistive element; and means for regulating the alternating current voltage transmitted to the electrically resistive element at a predetermined alternating current voltage.

To achieve these objects, the present invention also comprises a method and an apparatus for creating an electrofusion between a plurality of thermoplastic members, wherein at least one of the members has an electrically resistive element embedded therein, the apparatus comprising: means for identifying the thermoplastic member having the electrically resistive element embedded therein by measuring the resistance of the electrically resistive element; a programmable electronic data processing means for executing programmed arithmetic and logical processes and storing data, wherein the data processing means compares the resistance to a data table stored in the data processing means, and sorts duplicate fittings by the most frequently-used fitting; means for generating an alternating current voltage from a direct current power supply; and means for transmitting the alternating current voltage to the electrically resistive element.

To further achieve these objects, the present invention comprises a method and an apparatus for creating an electrofusion between a plurality of thermoplastic members, wherein at least one of the members has an electrically resistive element embedded therein, the apparatus comprising: means for identifying the thermoplastic member having the electrically resistive element embedded therein by measuring the resistance of the electrically resistive element; a programmable electronic data processing means for executing programmed arithmetic and logical processes and storing data, wherein the data processing means compares the resistance to a data table stored in the data processing means, and sorts duplicate fittings by the most frequently-used fitting; means for generating a voltage from a power supply; and means for transmitting the voltage to the electrically resistive element.

Another feature of the present invention and further in accordance with the objects, the present invention comprises a method and apparatus for creating an electrofusion between a plurality of thermoplastic members, wherein at least one of the members has an electrically resistive element embedded therein, the apparatus comprising: a programmable electronic data processing means for executing programmed arithmetic and logical processes and storing data, wherein the data processing means checks that sufficient energy is available in a direct current power supply to provide enough energy to the electrically resistive element to complete the electrofusion; means for generating an alternating current voltage from the direct current power supply; and means for transmitting the alternating current voltage to the electrically resistive element.

Still another feature of the present invention and further in accordance with the objects, the present invention comprises a method and an apparatus for creating an electrofusion between a plurality of thermoplastic members, wherein at least one of the members has an electrically resistive element embedded therein, the apparatus comprising: a programmable electronic data processing means for executing programmed arithmetic and logical processes and storing data, wherein the data processing means checks that sufficient energy is available in a power supply to provide enough energy to the electrically resistive element to complete the electrofusion; means for generating a voltage from the power supply; and means for transmitting the voltage to the electrically resistive element.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings:

FIGS. 6A, 6B, 6C, and 6D is an electrical schematic of an AC generator/voltage control, current sensor and voltage sensor of the electrofusion system shown in FIGS. 2A, 2B, 2C, and 2D.

DESCRIPTION OF THE PREFERRED EMBODIMENT

Figure 1:
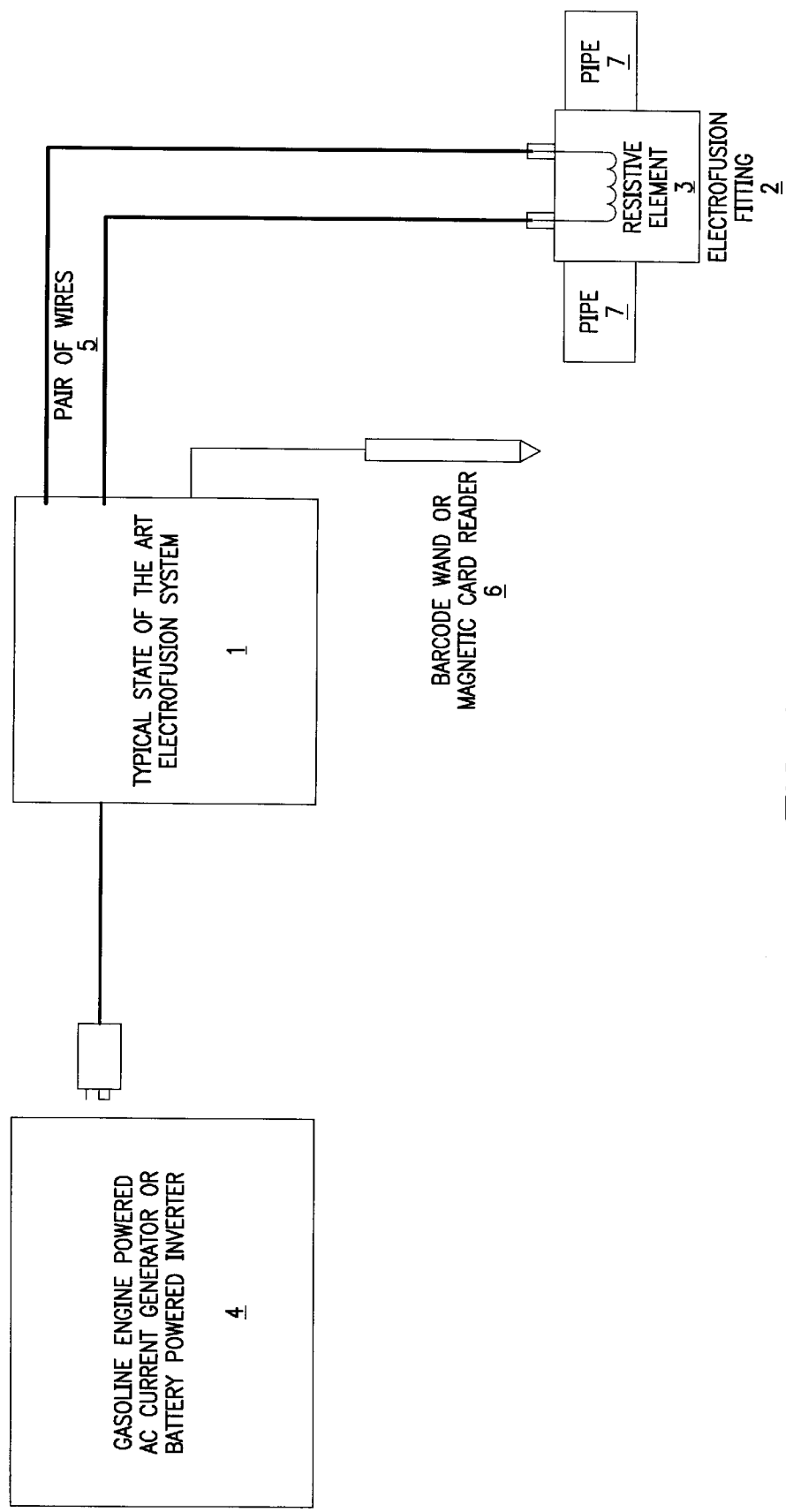
FIG. 1 is a block diagram illustrating a conventional electrofusion system.
Figure 2A:
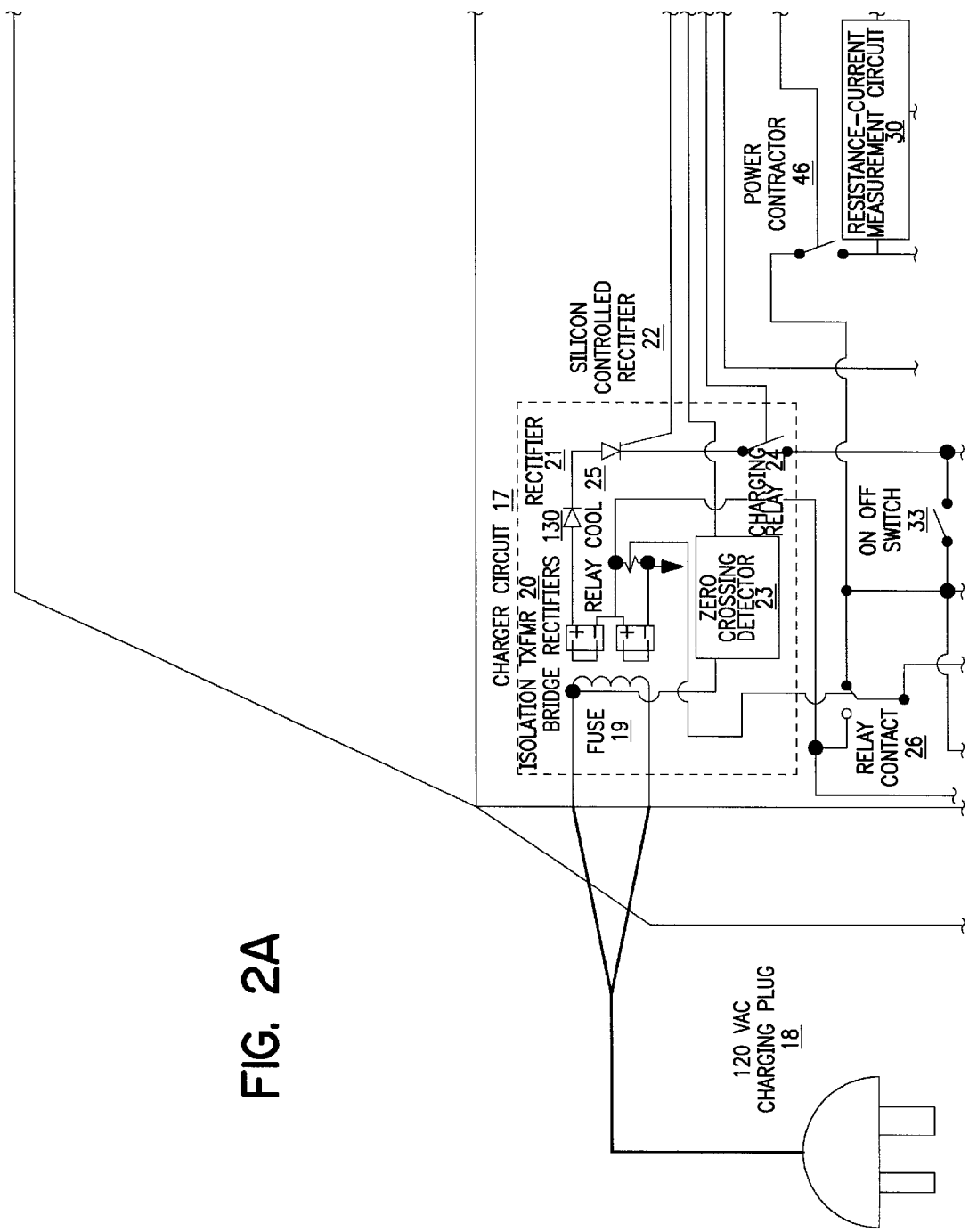
FIGS. 2A, 2B, 2C, and 2D is a block diagram illustrating the electrofusion system of a preferred embodiment of the present invention.
Figure 2B:
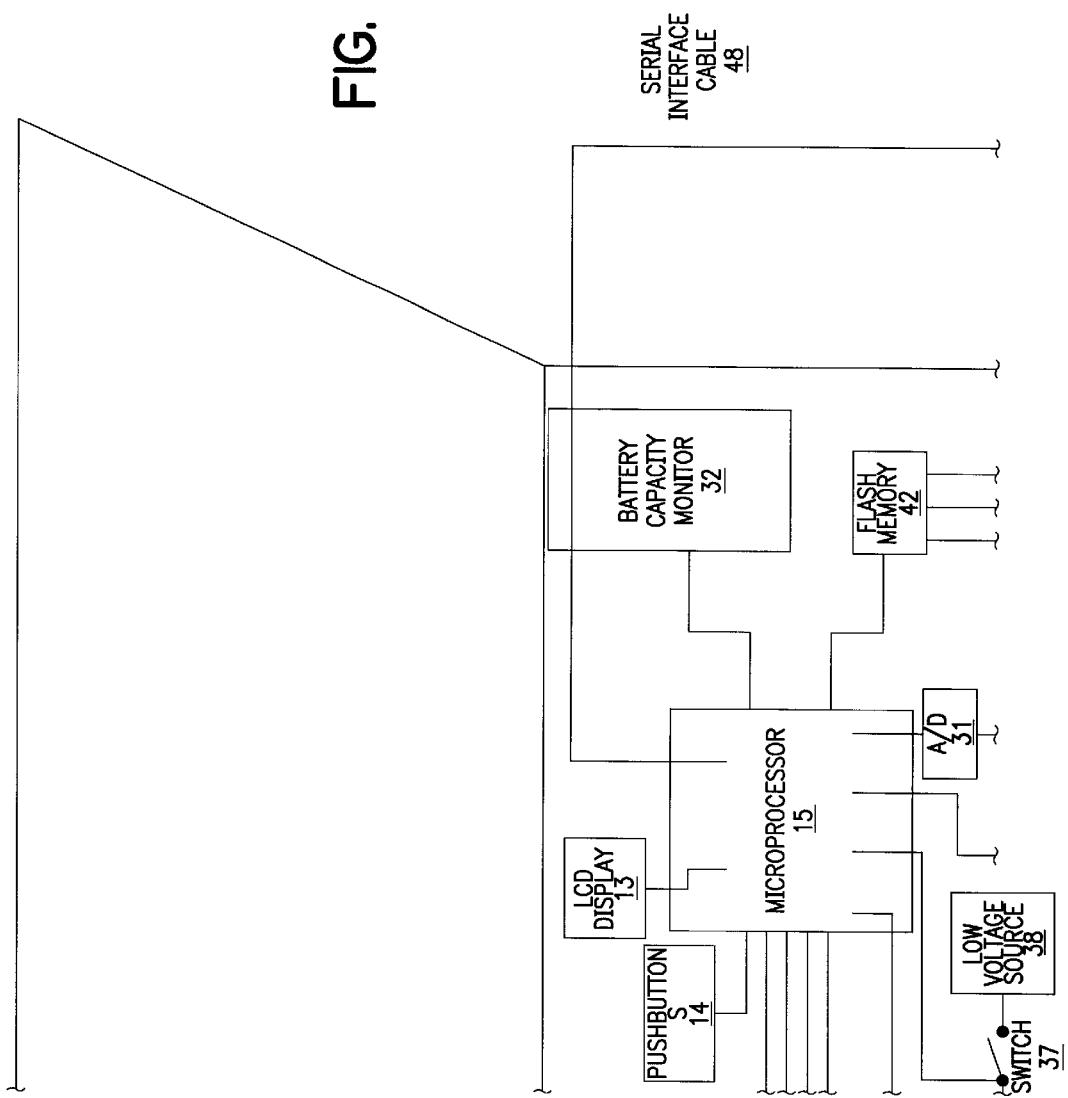
Figure 2C:
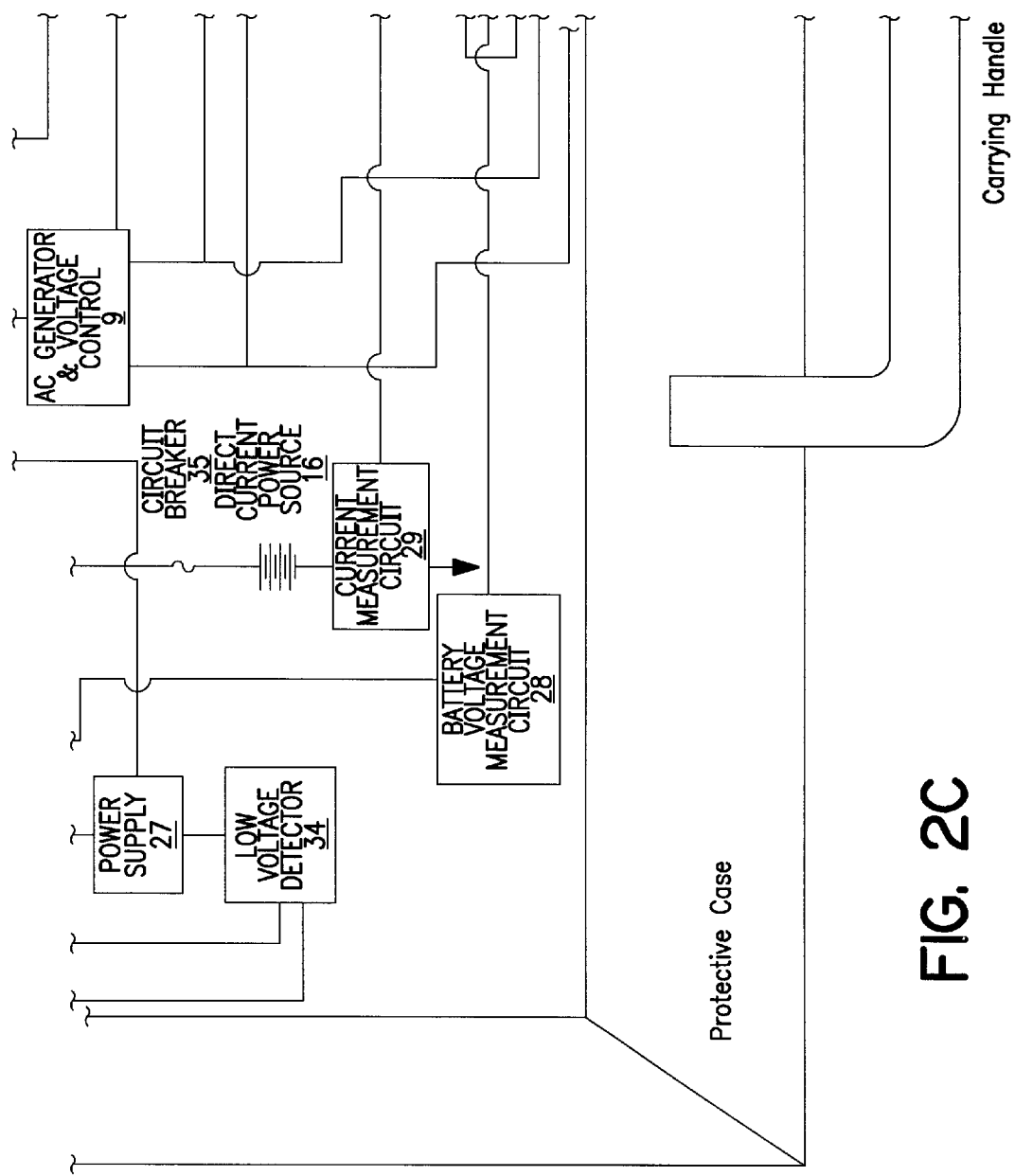
Figure 2D:
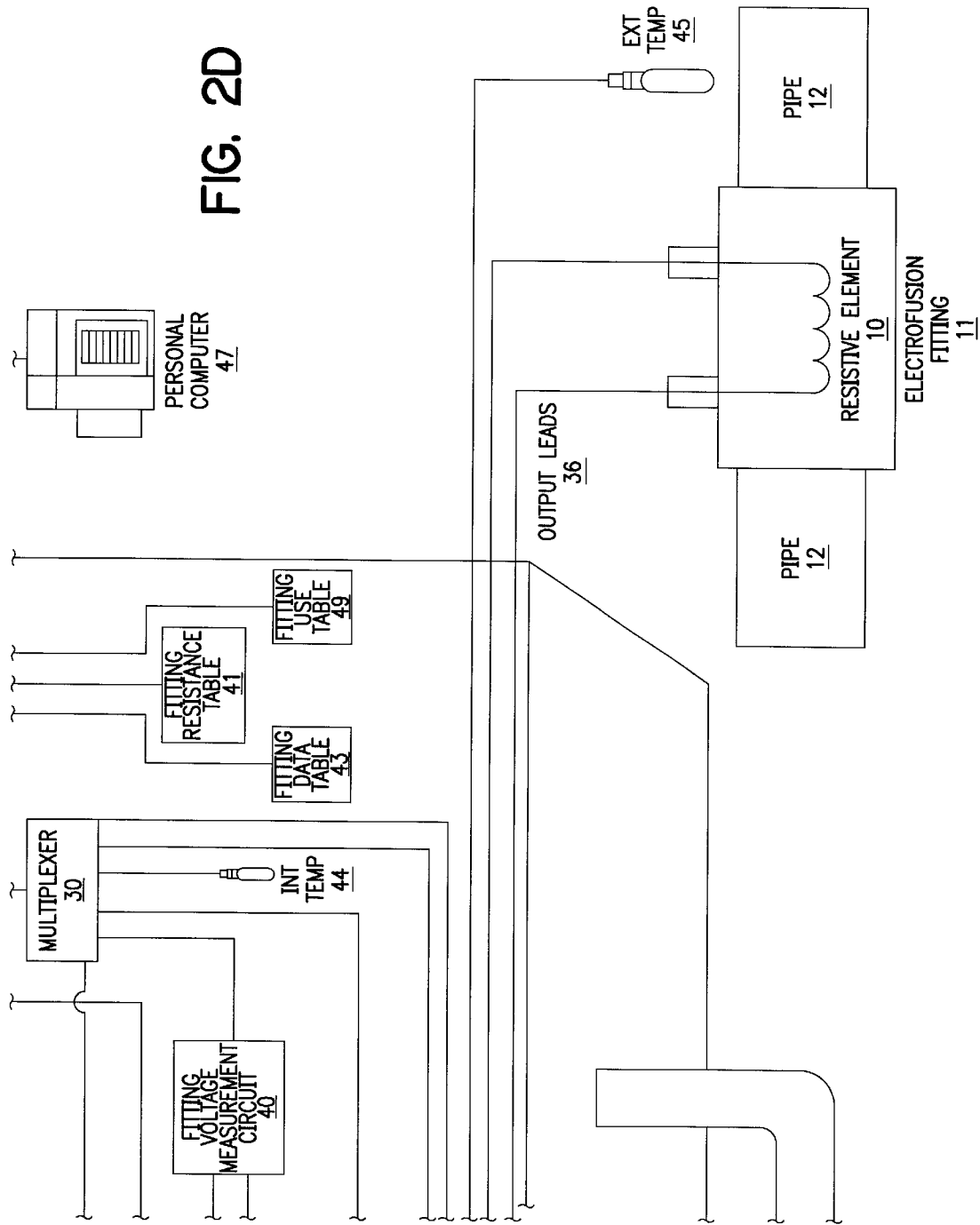
Figure 3A:
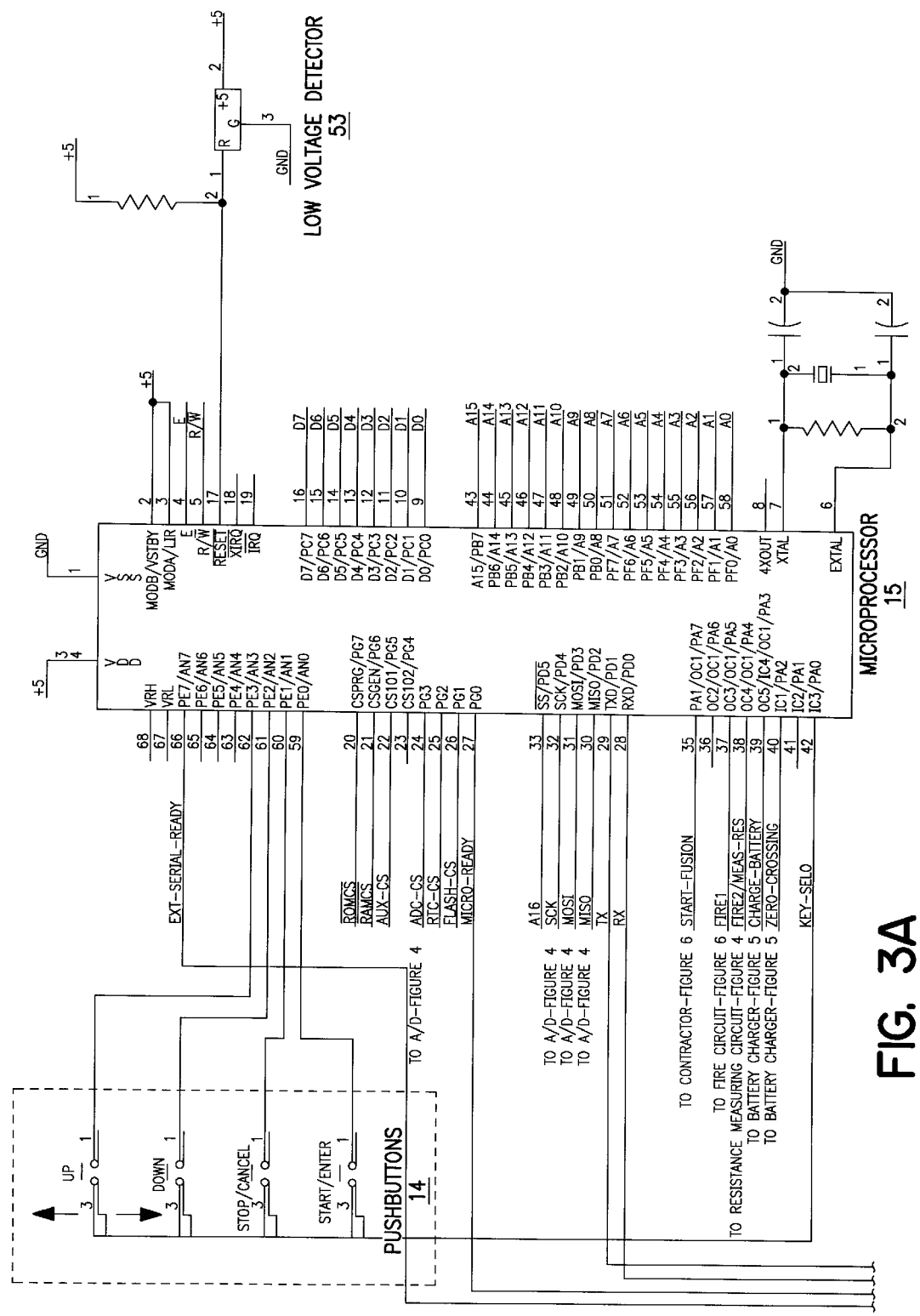
FIGS. 3A, 3B, 3C, and 3D is an electrical schematic of a computer, readout, EPROM and flash memory of the electrofusion system shown in FIGS. 2A, 2B, 2C, and 2D.
Figure 3B:
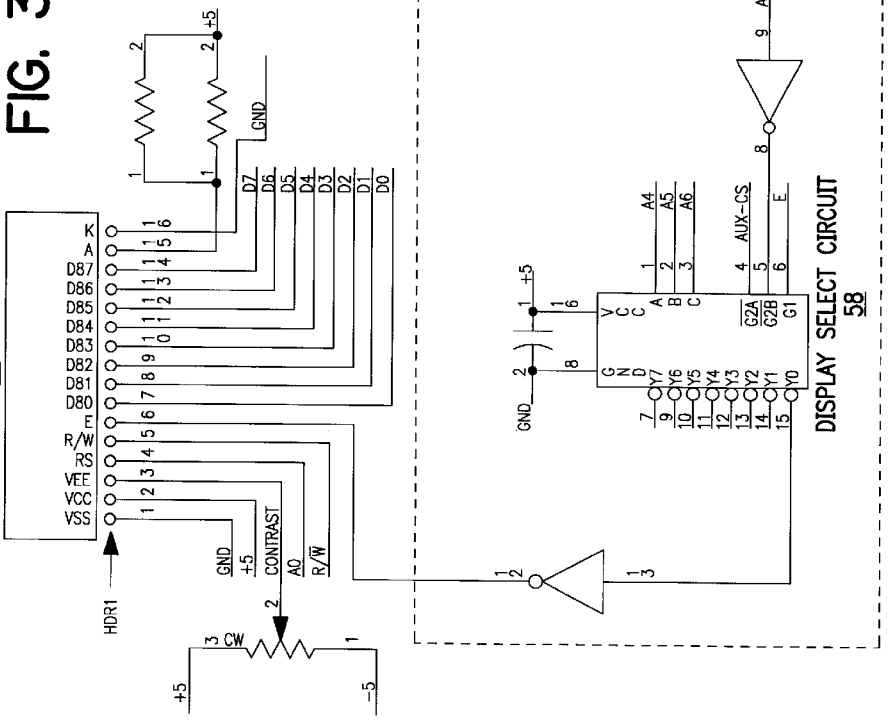
Figure 3B:
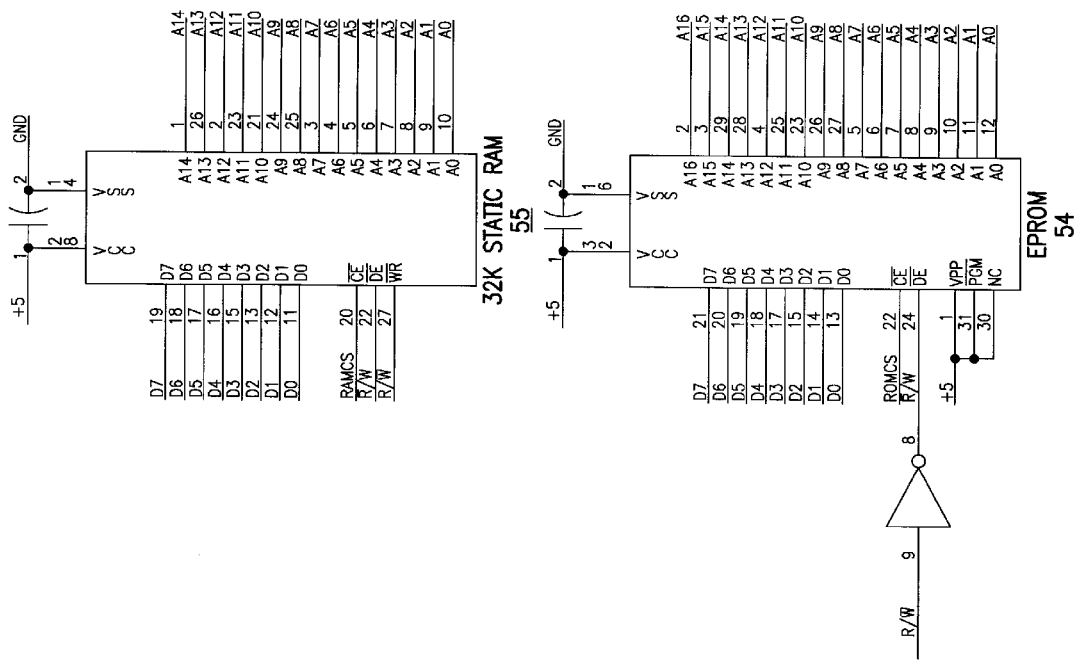
Figure 3C:
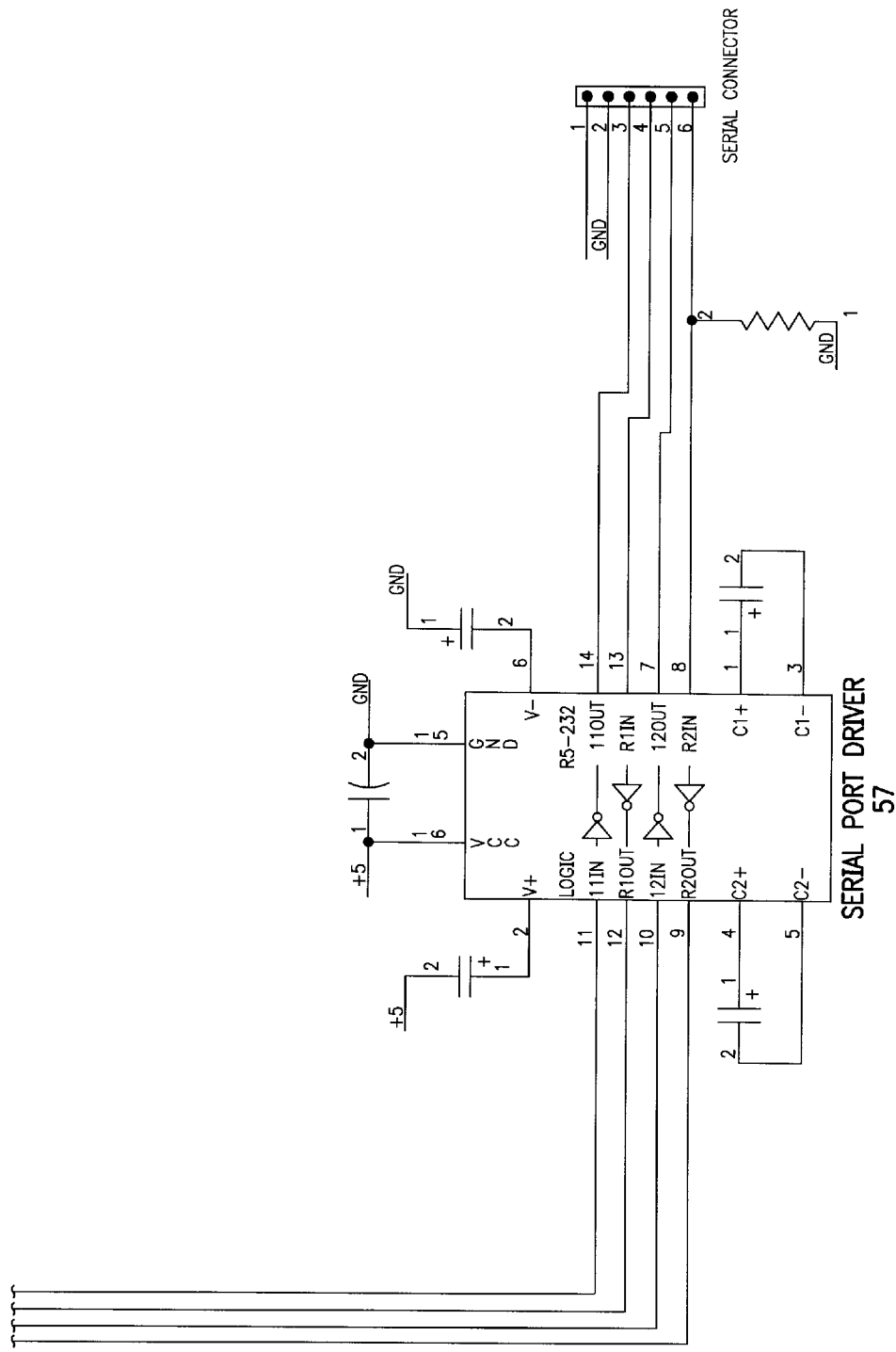
Figure 3D:
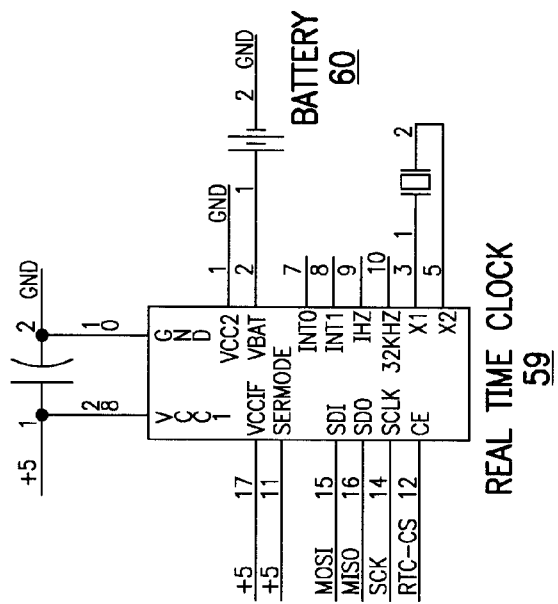
Figure 3D:
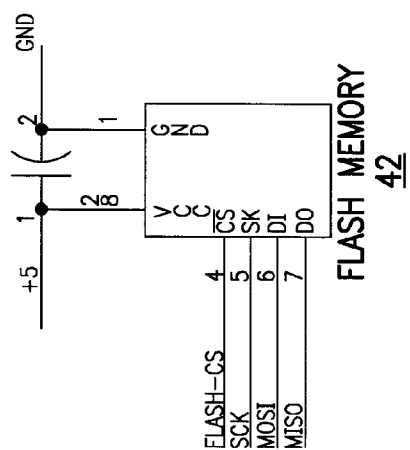
Figure 3D:
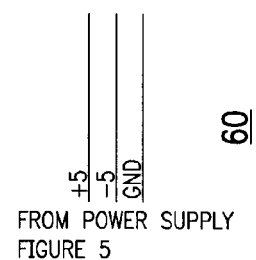
Figure 4A:
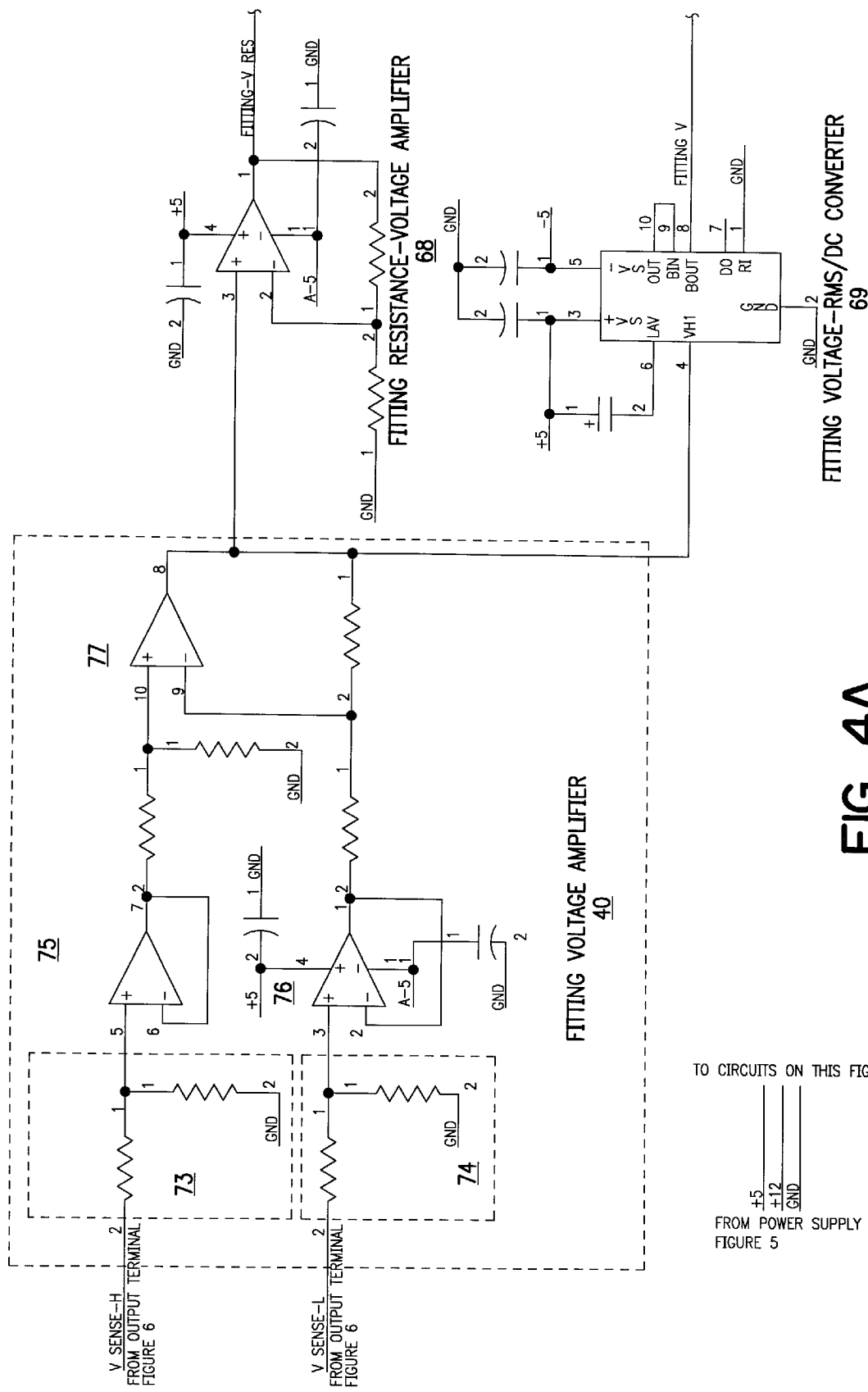
FIGS. 4A, 4B, 4C, and 4D is an electrical schematic of a resistance measuring circuit, multiplexer and analog-to-digital converter of the electrofusion system shown in FIGS. 2A, 2B, 2C, and 2D.
Figure 4B:
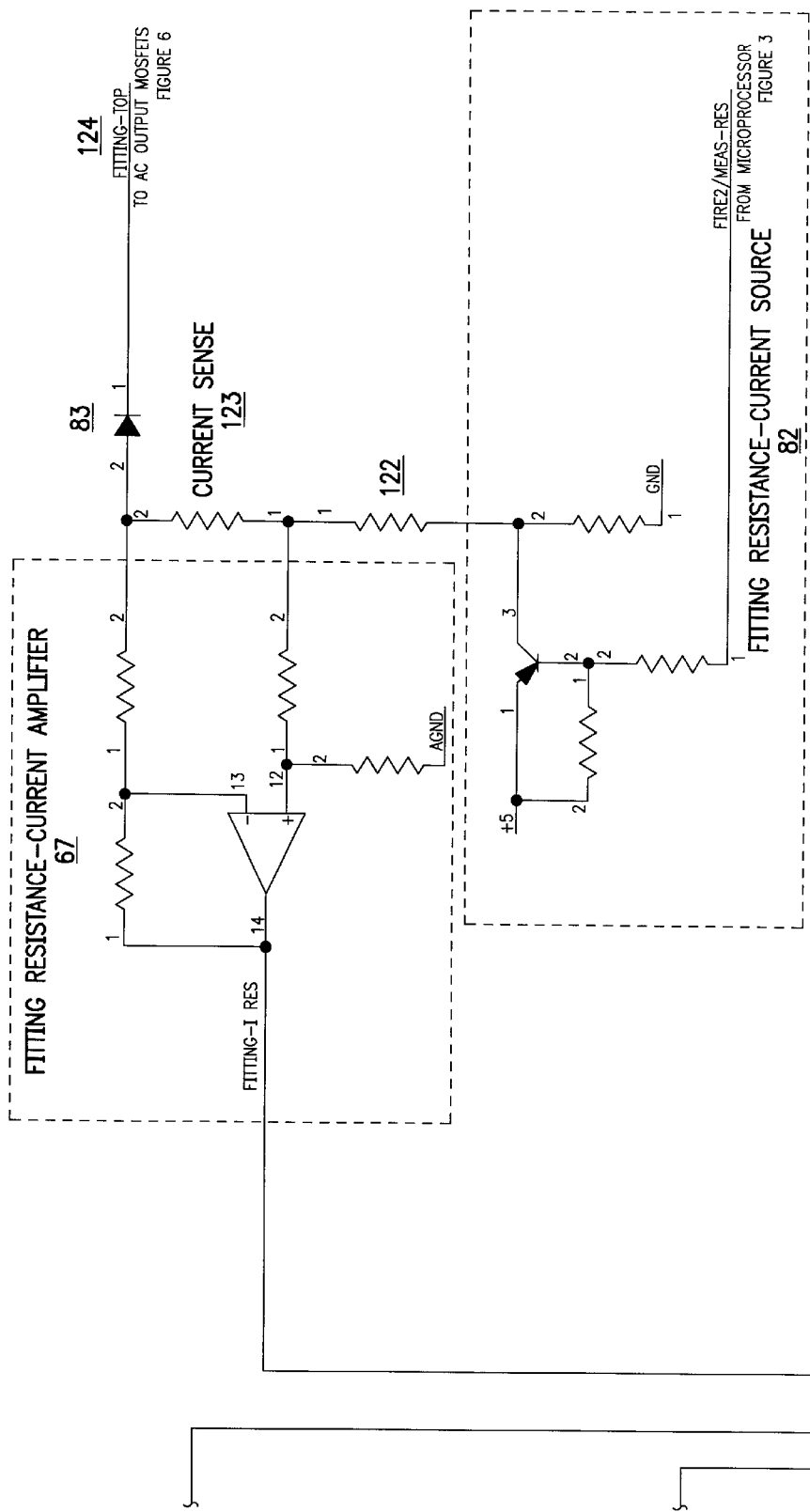
Figure 4C:
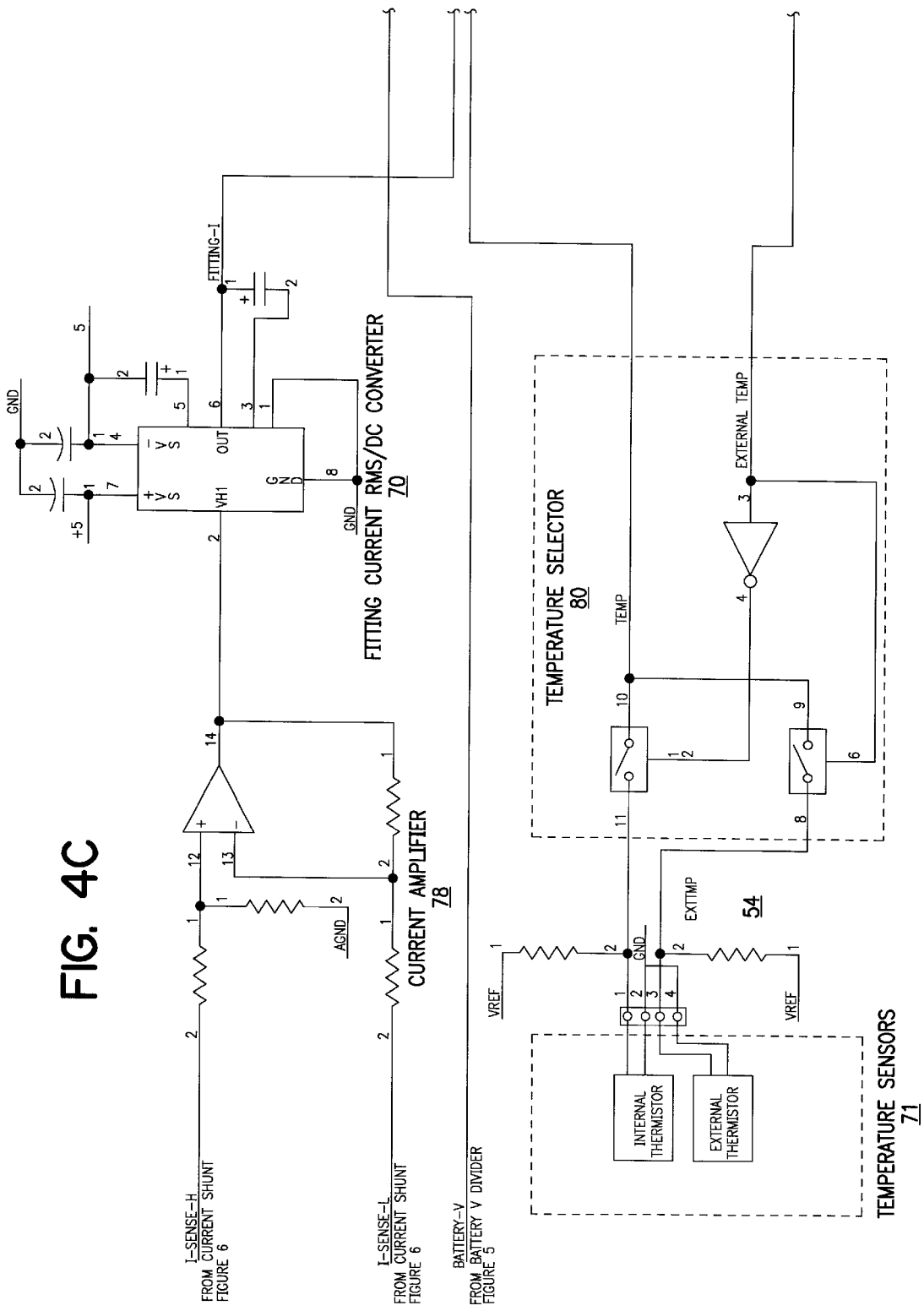
Figure 4D:
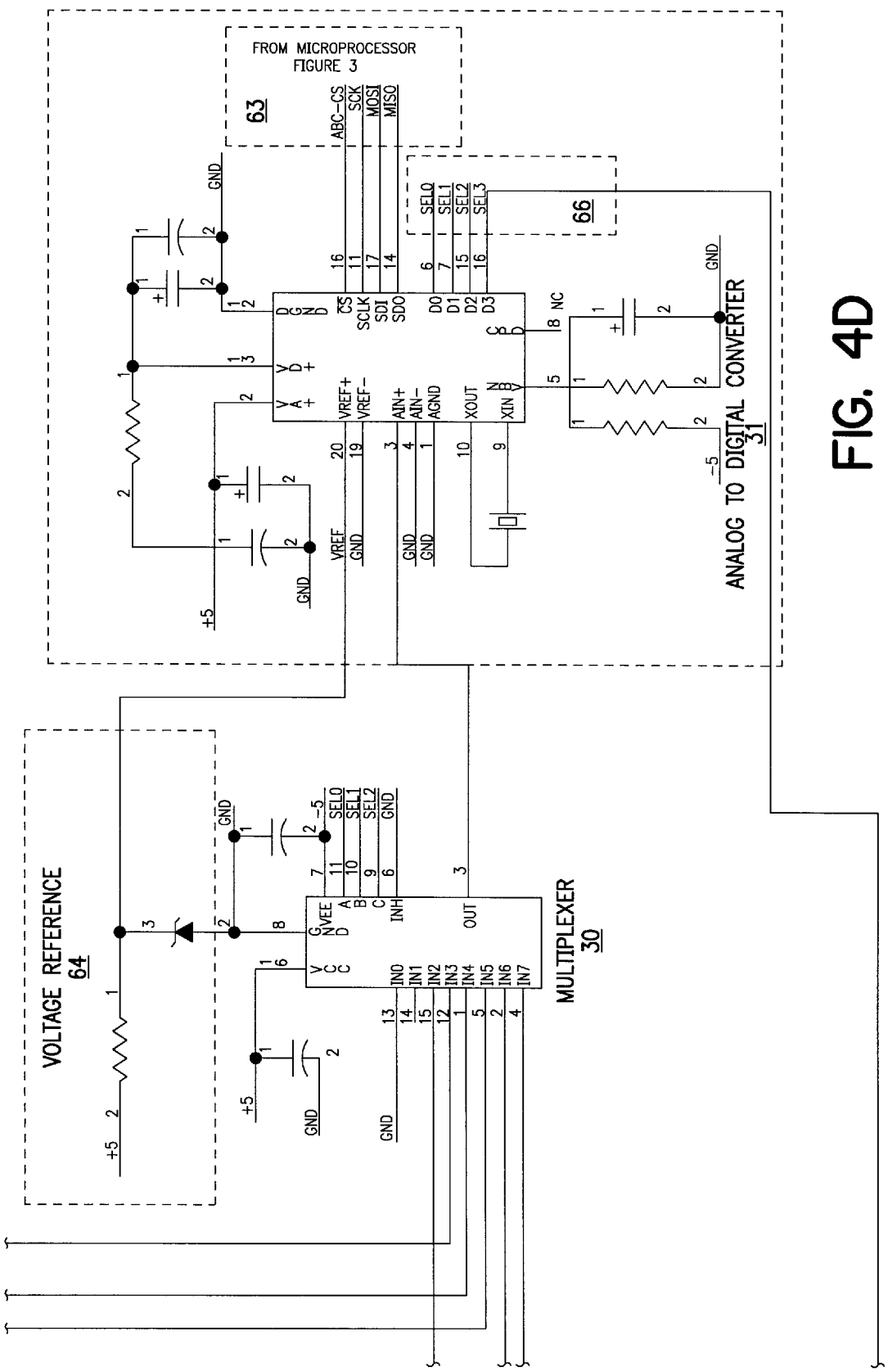
Figure 5A:
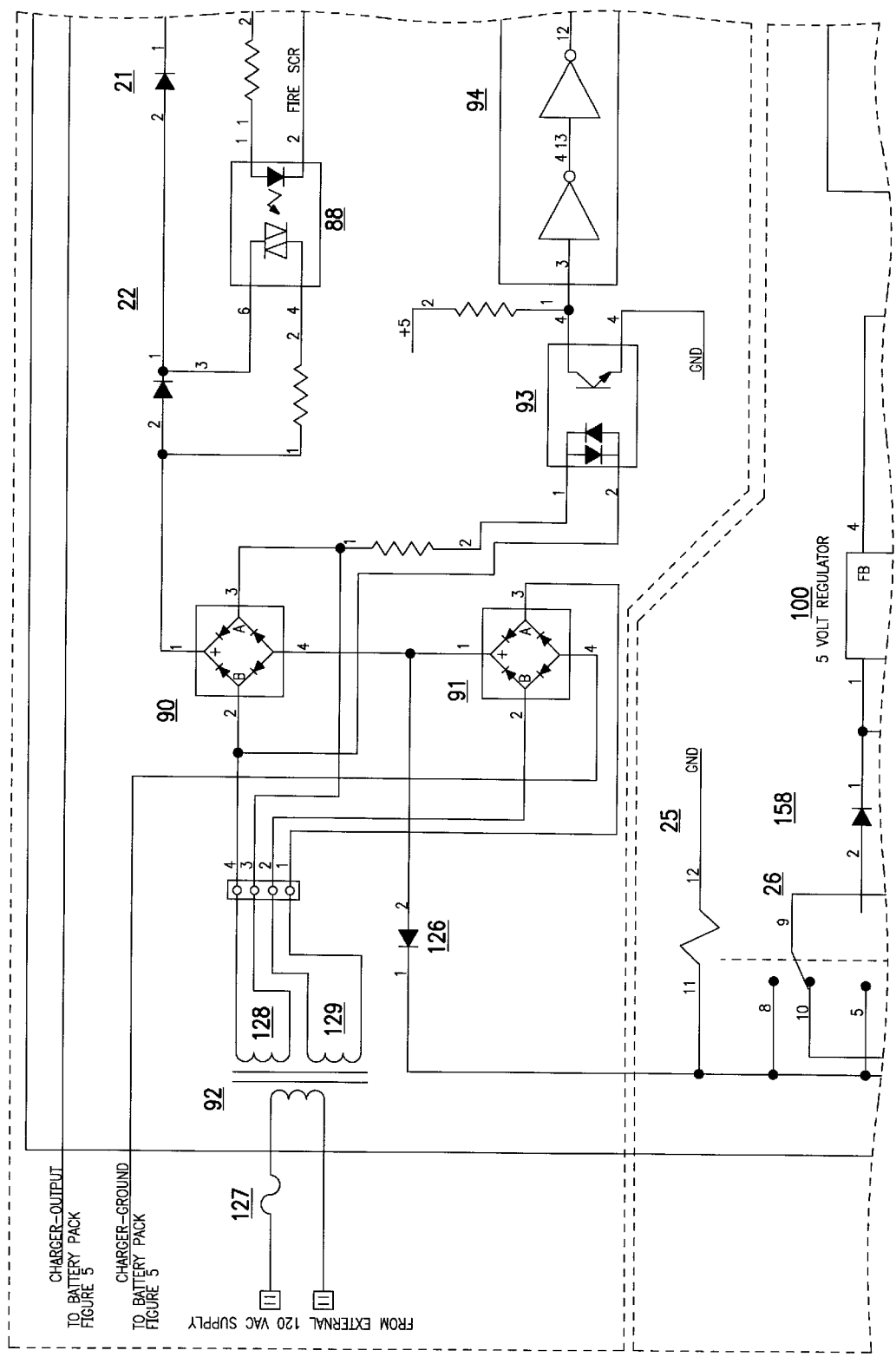
FIGS. 5A, 5B, 5C, and 5D is an electrical schematic of a power supply and low voltage shutoff of the electrofusion system shown in FIGS. 2A, 2B, 2C, and 2D.
Figure 5B:
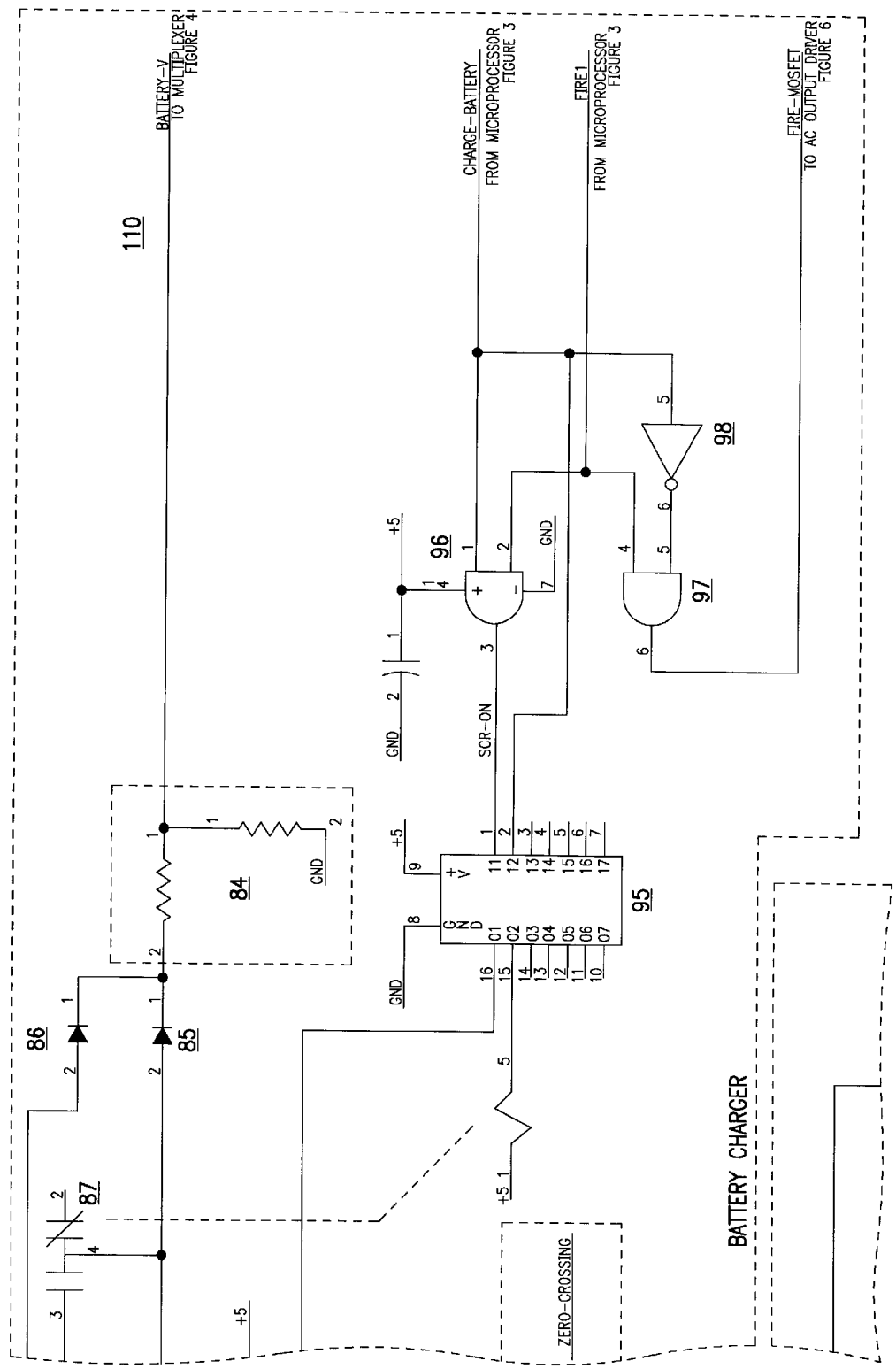
Figure 5C:
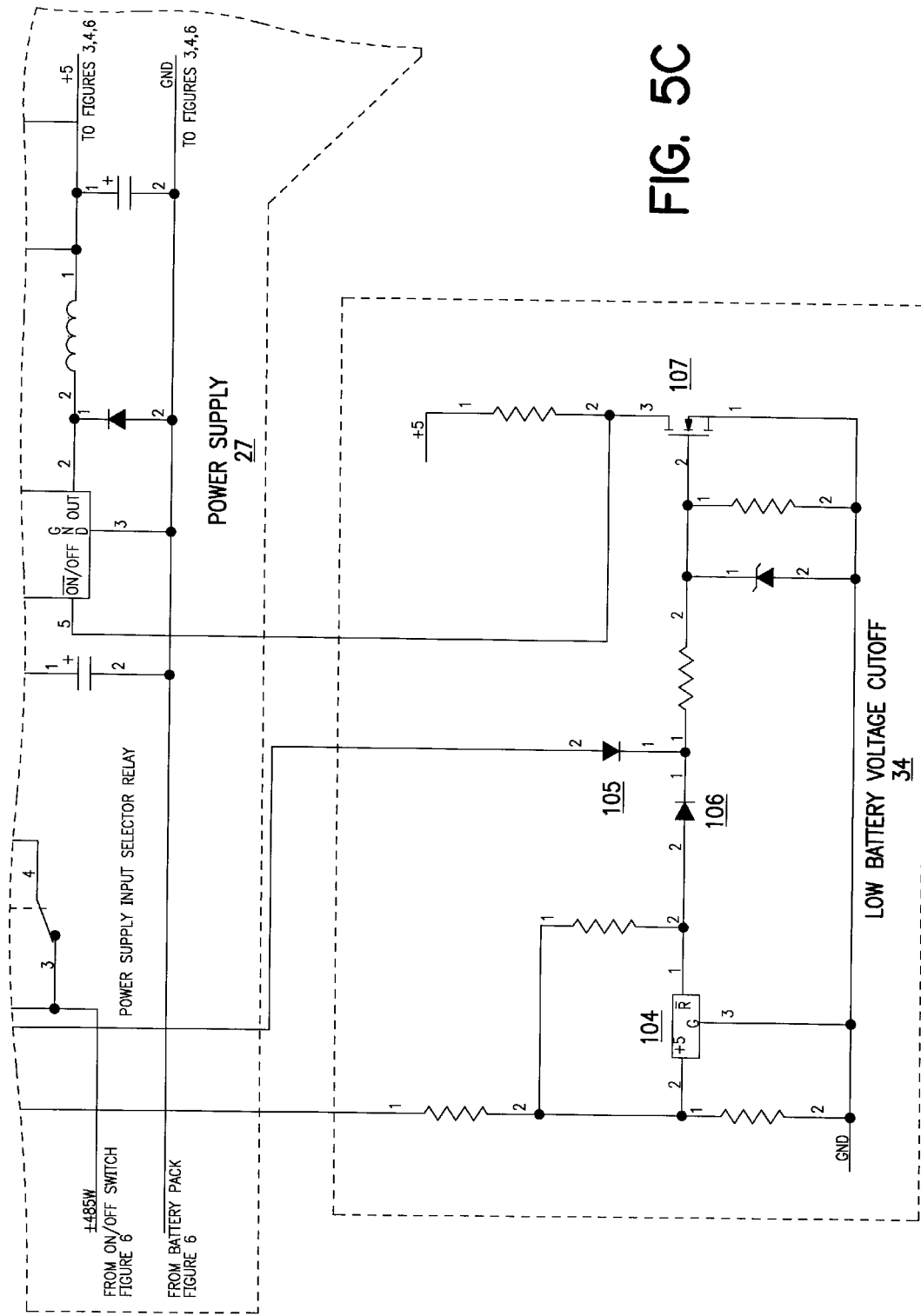
Figure 5D:
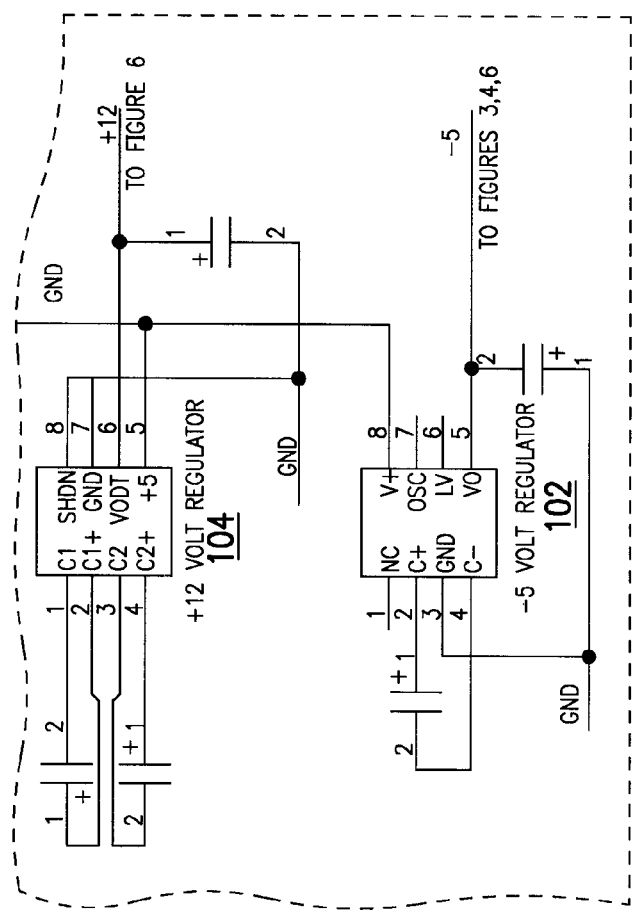

Reference will now be made in detail to the present preferred embodiment of the invention, an example of which is illustrated in the accompanying drawings. Wherever possible, the same reference numbers will be used throughout the drawings to refer to the same or like parts.

A. General System Description

FIG. 2 illustrates an electrofusion system 8 of the preferred embodiment of the present invention. Electrofusion system 8 includes an AC generator and voltage control 9 that provides an AC voltage to a resistive element 10 embedded in a thermoplastic electrofusion fitting 11 that is to be fused to a thermoplastic pipe 12. Electrofusion system 8 further comprises an LCD display 13 and pushbuttons 14 which the user reads and manipulates to control system 8, and a microprocessor 15 which controls the operation of system 8. The system 8 also includes a DC power source 16 which may comprise a primary battery located inside or outside system 8, a secondary battery located inside or outside system 8, a full cell located inside or outside system 8, or any other DC power source known to one of ordinary skill in the art. As used herein, the term "primary batter" means a battery that cannot be charged, whereas the term "secondary battery" means a battery that can be charged. Examples of batteries capable of use with the present invention include twenty-four two-volt, sealed lead acid batteries, sixteen three-volt lithium batteries, forty nicad batteries, thirty-two D-size flashlight batteries, or a truck battery.

Operation of electrofusion system 8 may be subdivided into three distinct parts: (1) the charging operation; (2) the fusing operation; and (3) the uploading/identification operation.

1. The Charging Operation

The charging operation includes a charger circuit 17 comprised of: a 120 VAC plug 18; a fuse 19; an isolation transformer 20; bridge rectifiers 130; a rectifier 21; a silicone controlled rectifier (SCR) 22 to control the charging voltage; a zero crossing detector 23; and a charging relay 24. When 120 VAC plug 18 is plugged into an external 120 volt AC source, current flows to isolation transformer 20 and energizes relay coil 25, closing relay contact 26 and providing a DC voltage to power supply 27. Microprocessor 15 accordingly boots and looks for zero crossings from zero crossing detector 23. When the zero crossings are detected, microprocessor 15 starts the battery charging code, which, in turn, starts a three-phase charging routine. The charging routine fires SCR 22 to maintain the proper charging current or voltage. A battery measurement circuit 28 and a current measurement circuit 29 are used in conjunction with a multiplexer 30 and an analog-to-digital converter 31 to measure battery 16 current and voltage and to provide feedback to the charging control algorithm.

The three-phase charging routine starts by closing charging relay 24, then charges power source 16 at a high constant current until the voltage of power source 16 reaches a predetermined point. The charging routine then switches to a constant voltage charge until the current drops to a predetermined level. Next, the charging routine switches to a timed charge for a predetermined time. After the predetermined time has expired, charging relay 24 is opened to terminate the charge. When the charge is terminated, a battery capacity monitor 32 is loaded with the amount of charge that was returned to power source 16. This information is used to determine if there is enough energy in power source 16 to complete a fusion.

2. The Fusing Operation

The fusing operation is started by first turning an on/off switch 33 to the on position. On/off switch 33 is used to either turn the system on or off in normal operation or to cut off power in an emergency. When on/off switch 33 is turned to the on position, direct current voltage goes to power supply 27 which, in turn, supplies the +5, −5, and +12 volt direct current necessary to operate all circuits. A low voltage detector 34 monitors the voltage of the power source 16 and shuts down power supply 27 if the system is inadvertently left on, protecting power source 16 from damage. A circuit breaker 35 is also provided to protect power source 16 from a short circuit. When on/off switch 33 is turned on, microprocessor 15 boots, conducts a pre-startup checkout to insure that it is operating properly, loads all measurement calibration data from internal memory, verifies that all calibration data is within acceptable tolerances, and instructs the operator to connect fitting 11 to output leads 36. Microprocessor 15 then closes a switch 37 which, in turn, switches a low voltage source 38 through a resistance-current measurement circuit 39, AC generator and voltage control 9 and output leads 36. Microprocessor 15 also switches multiplexer 30 to read the current provided to fitting 11 with resistance-current measurement circuit 39, and to read the voltage provided to fitting 11 with a voltage measurement circuit 40. Microprocessor 15 then calculates the fitting resistance using Ohms Law (Resistance =Voltage/Current).

Microprocessor 15 then compares the fitting resistance to the data in a fitting resistance table 41, stored in flash memory 42, in order to find a unique match. If there are multiple fittings with the same resistance, then these fittings are sorted by the most frequently used fittings such that the most frequently used fitting is displayed first in order to eliminate user confusion. Fitting information is then displayed on LCD display 13 to allow the user to select the proper fitting to be fused by scrolling through the list with pushbuttons 14. When the user selects the proper fitting, microprocessor 15 performs the following steps:

(1) re-measure the fitting resistance to verify that the resistance is within the specified tolerance;

(2) check to see if there is enough energy in the battery to fuse fitting 11 to completion;

(3) set the output voltage control to the correct voltage from a fitting data table 43; and (4) measure an external temperature sensor 45 (or measure an internal temperature sensor 44 if external temperature sensor 45 is not attached), and calculate the appropriate fusion time with the fusion time and temperature compensation time from fitting data table 43;

(5) close a power contactor 46, turn on AC generator and voltage control 9;

(6) measure the fitting voltage with fitting voltage measurement circuit 40; and (7) modulate AC generator and voltage control 9 to force the voltage on fitting 11 to be equal to the voltage obtained from fitting data table 43.

While the fusion is in progress, microprocessor 15 measures fitting voltage using fitting voltage measurement circuit 40 and further measures the fitting current using current measurement circuit 39 to assure that the fusion is progressing properly. If the fitting voltage drifts out of its control limits of ± two percent, or the current rises outside of its limits, the fusion is terminated and the proper error is displayed to the user on LCD display 13. If no errors occur then the fusion is terminated at a proper time calculated earlier.

When the fusion is terminated, normally or otherwise, fusion data is written to flash memory 42 for later downloading. The fusion data written to memory 42 includes, but is not limited to: electrofusion system serial number, electrofusion system model number, fusion number, fusion date and time, fitting manufacturer, fitting type, fitting size, ambient temperature, fusion voltage, nominal fusion time, adjusted fusion time (compensated for ambient temperature), actual time fused, measured fitting resistance, highest and lowest measured output voltage, highest and lowest measured power supply voltage, highest and lowest calculated duty cycle, fusion result, operator, and location.

3. The Uploading/Identification Operation

The system for uploading fitting data and identifying a thermoplastic electrofusion fitting includes electrofusion system 8, a personal computer 47, and a serial interface cable 48. Preferably, personal computer 47 comprises a typical microprocessor-based computing device such as an IBM-compatible personal computer. Software running on personal computer 47 is used to generate custom lists of thermoplastic electrofusion fittings 11. These lists are saved as fitting data files (one fitting data file for each list) on some type of storage media compatible with the hardware available to personal computer 47, such as, for example, a hard disk drive, floppy disk drive, CD ROM, etc. Each fitting data file will include a version number, a version date, a version title as well as the number of thermoplastic electrofusion fittings included in the list. In addition, each fitting data file includes the following information for each thermoplastic electrofusion fitting in the list: (1) manufacturer of the thermoplastic electrofusion fitting; (2) type of the thermoplastic electrofusion fitting; (3) size of the thermoplastic electrofusion fitting; (4) resistance of the thermoplastic electrofusion fitting; (5) resistance tolerance of the thermoplastic electrofusion fitting; (6) fusion voltage; (7) fusion time (in seconds); (8) time/temperature compensation; and (9) cooling time.

Each fusion data file also includes a checksum character and an end of file character used by electrofusion system 8 to determine when the file was received and to verify that the contents are correct. Electrofusion system 8 connects to personal computer 47 using serial interface cable 48, and software running on computer 47 transfers the requested fitting data file to microprocessor 15. Using the checksum and end of file characters, microprocessor 15 verifies that the fitting data file has been received without error. The data is then stored in flash memory chip 42 in 3 separate parts:

(1) fitting data table 43, as described above;

(2) fitting resistance table 41 containing the minimum and maximum allowable values for each thermoplastic electrofusion fitting; the values in fitting resistance table 41 are calculated using the resistance and resistance tolerance specified in fitting data table 43; and (3) a fitting use table 49 containing the number of fusions that have been performed using the respective thermoplastic electrofusion fitting; when electrofusion system 8 is reprogrammed, the values in fitting use table 49 are reset to zero and are incremented by one each time that particular fitting is fused.

As described in Section A.2, when a thermoplastic fitting is connected to output leads 36, microprocessor 15 calculates the resistance of thermoplastic fitting 11. This measured resistance is then compared to the maximum and minimum resistance values stored in fitting resistance table 41 and a list of possible fittings is compiled. If there are no fittings in fitting resistance table 41 that match the measured resistance, an appropriate error message is displayed on LCD 13. If one fitting in fitting resistance table 41 matches the measured resistance, then microprocessor 15 obtains a detailed fitting description from fitting data table 43 and displays that data on LCD 13. If more than one fitting in fitting resistance table 41 matches the measured resistance, then microprocessor 15 will first prioritize the list based on information contained in fitting use table 49 so that the fitting used the most in the past will be displayed first. Microprocessor 15 then obtains a detailed fitting description from fitting data table 43 and displays that data on LCD 13. The operator may now use pushbuttons 14 to scroll through the list of possible fittings. When the operator has selected the correct fitting description, electrofusion system 8 applies the correct voltage for the time calculated using the data from fitting data table 43 as described in Section A.2 above. This data is stored in flash memory 42 for future downloading.

The automatic fitting identification process can be used with any electrofusion system, processor and power supply currently available. For example, the automatic fitting identification process is not limited to use with battery-powered DC power source 16, but may be used with any DC or AC power supply.

B. Detailed Circuit Description

FIG. 3 illustrates the preferred embodiment of microprocessor 15 and associated support circuits. Power for microprocessor 15 and associated support circuits 60 is supplied from power supply 27. Operator interface is handled by twenty-character-by-four-line liquid crystal display 13 and pushbuttons 14. A display select circuit 58 is used to select the display during specific memory writes. A low voltage detector 53 monitors the five-volt supply and resets microprocessor 15 if the five-volt supply drops below 4.5 volts. An EPROM 54 stores the program, a static RAM 55 stores temporary variables, and flash memory 42 stores fitting data, fusion data and charging history. A serial port driver chip 57 provides data communication between computer 47 and microprocessor 15. Time is kept by a real time clock chip 59, wherein power supply 27 allows real time clock chip 59 to run when microprocessor 15 is turned off.

FIG. 4 illustrates the preferred embodiment of the analog measurement circuits. All analog measurements are handled by analog-to-digital (A/D) converter 31. Digital data is communicated serially to microprocessor 15 by ADC-CS, SCK, MOSI, and MISO lines 63. All analog information is compared to a voltage reference 64 and converted to digital data by A/D converter 31. Multiplexer 30 is used to switch the various analog signals to A/D converter 31 for measurement. Multiplexer 30 is controlled by microprocessor 15 through data lines SEL0, SEL1 and SEL2 on A/D converter 31. Actual values such as temperature and fitting resistance use one or more measured values and require calculations by microprocessor 15.

Figure 6B:
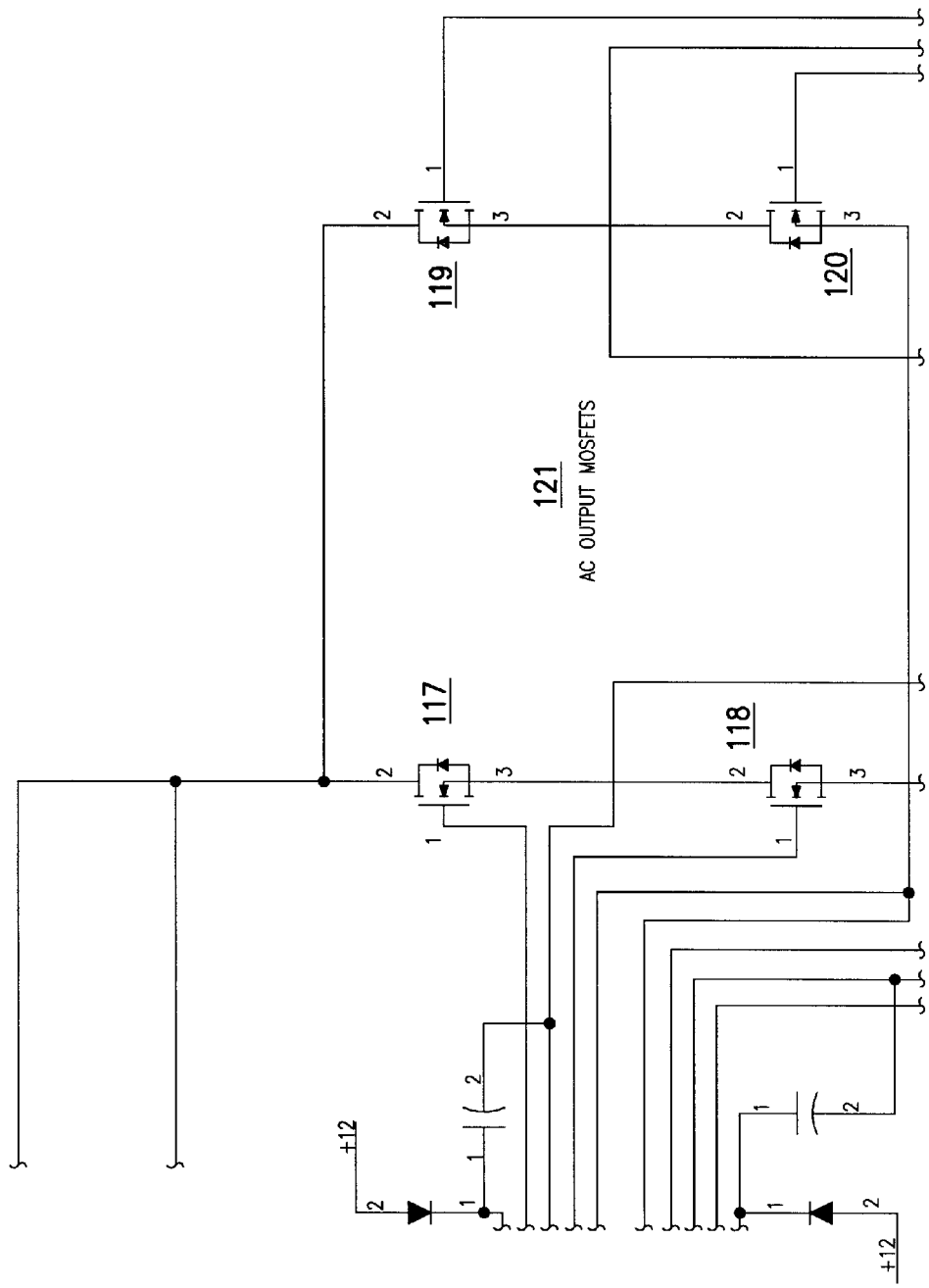
Figure 6C:
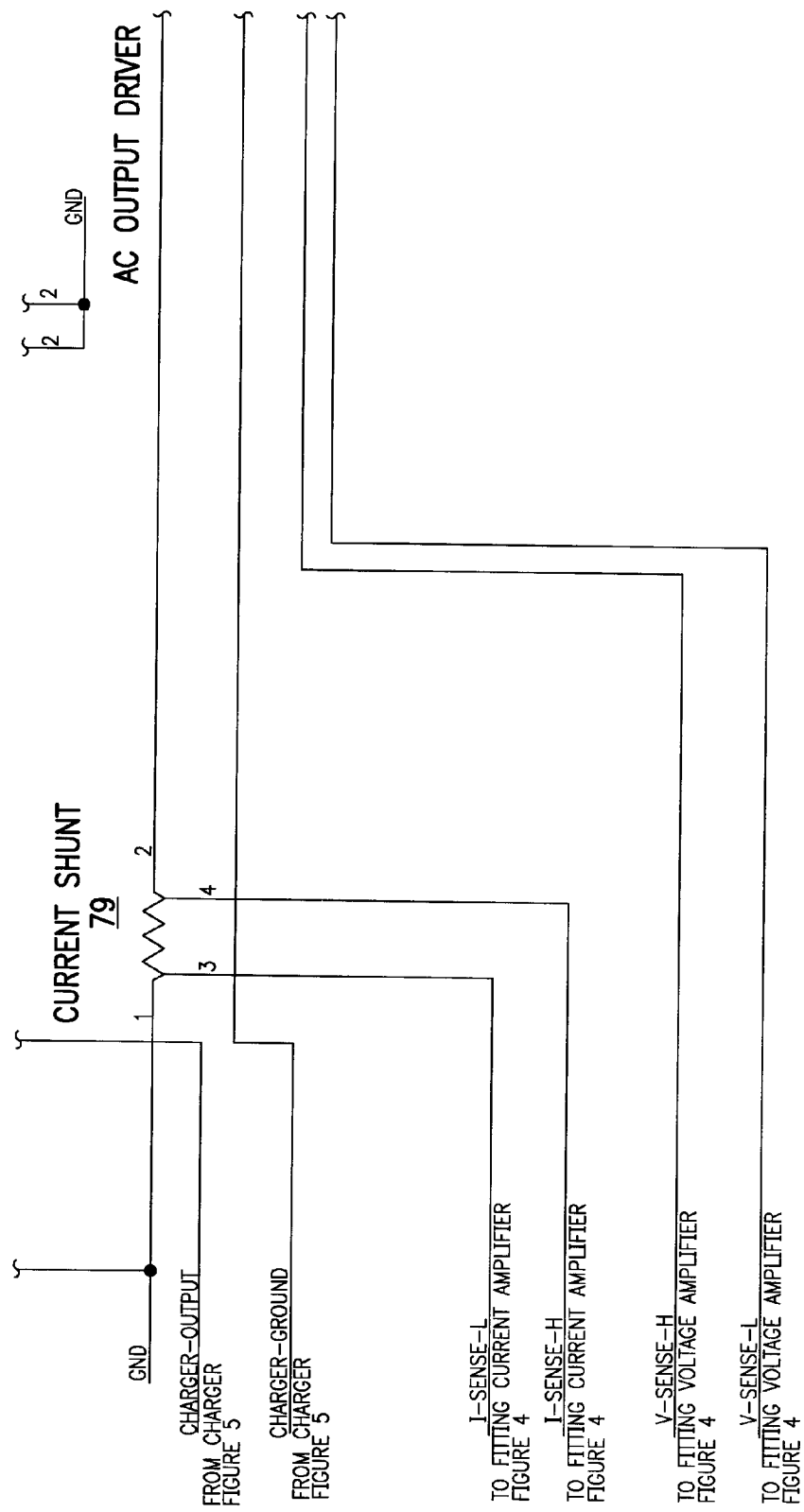

Input IN0 connects to ground and is used to measure the ground potential and compensate for voltage offsets in A/D converter 31. Input IN2 measures battery voltage to be used in the battery charging control. Input IN3 measures the output of a fitting resistance current amplifier 67. Input IN4 measures the output of a fitting resistance voltage amplifier 68. Input IN5 measures the output from a fitting fusion voltage RMS-to-DC converter 69. Input IN6 measures the output of a fitting current RMS-to-DC converter 70. Input IN7 measures the voltage from temperature sensors 71. A temperature selector 80 selects either the internal or external temperature sensor 71 and is controlled by microprocessor 15 through data line SEL3 in A/D converter 31. A fitting voltage amplifier circuit 40 measures the fitting voltage, and comprises voltage dividers 73, 74 which lower the voltage into the common mode range of the rest of the circuit, unity gain amplifiers 75, 76, and a differential amplifier 77. A current amplifier 78 amplifies the voltage drop across a current shunt 79 (shown in FIG. 6).

1. Battery Voltage Measurement

As shown in FIGS. 3–6, during normal operation, on/off switch 33 is closed and current flows through a wire 109, a diode 86, a voltage divider 84 to lower the voltage to an appropriate level for the rest of the circuits, a wire 110, multiplexer 30, input IN2, and to A/D converter 31. Microprocessor 15 receives the data from A/D converter 31, and multiplies the analog voltage by the ratio provided by voltage divider 84 and by a calibration gain factor stored in flash memory 42, to measure the actual battery voltage. During the charging cycle when on/off switch 33 is open, the battery charge voltage is measured through a diode 85, voltage divider 84, wire 110, multiplexer 30, input IN2, and A/D converter 31. Microprocessor 15 receives the data from A/D converter 31 and multiplies the analog voltage by the ratio provided by voltage divider 84 and by the calibration gain factor stored in flash memory 42, to measure the actual battery charge voltage.

2. Fitting Resistance Measurement

During normal operation, fitting 11 is connected to output cable 36. The fitting resistance is measured by energizing fitting 11 with a low voltage, measuring the current through fitting 11 and the voltage drop across fitting 11 and calculating the resistance using Ohms Law. Microprocessor 15 sets an output FIRE1 to high which causes an AC Driver 116 to turn on MOSFETs 117, 120. Microprocessor 15 also sets an output FIRE2/MEAS-RES to low which turns on a fitting resistance current source 82, causing current to flow through a current limiting resistor 122, a current sense resistor 123, a diode 83, a wire 124, MOSFET 117, the left wire of output cable 36, the right wire of output cable 36, MOSFET 120, and current shunt 79, to ground. A fitting resistance current amplifier 67 amplifies the voltage drop across a current sense resistor 123, and sends the amplified voltage through multiplexer 30 to the A/D converter 31. Microprocessor 15 receives the data from A/D converter 31 and multiplies the analog voltage by the calibration gain factor stored in flash memory 42 to measure the actual current flowing through fitting 11. The voltage drop across fitting 11 is sensed by wires V-SENSE-H, V-SENSE-L. This voltage is amplified by fitting voltage amplifier 40, is further amplified by a fitting resistance-voltage amplifier 68, and is sent through multiplexer 30 to A/D converter 31. Microprocessor 15 receives the data from A/D converter 31, and multiplies the analog voltage by the calibration gain factor stored flash memory 42 to measure the actual voltage across fitting 11. Microprocessor 15 performs this calculation to calculate the actual fitting resistance.

3. Fitting Voltage Measurement

An accurate fitting voltage measurement is needed in order to control the AC voltage output. The fitting voltage is measured by transmitting the actual fitting voltage through the sense wires located in output cable 36. Current travels through wires V-SENSE-H, V-SENSE-L, and voltage dividers 73, 74 to bring the voltage level down to the common mode range. The signals traveling through wires V-SENSE-H, V-SENSE-L are then buffered through unity gain amplifiers 75, 76 before passing through differential amplifier 77 to isolate the voltage drop across fitting 11. The output of differential amplifier 77 is then passed through a RMS-to-DC converter in order to convert the AC signal to a DC value required by A/D converter 31. This signal is then sent through multiplexer 30 to A/D converter 31. Microprocessor 15 receives the data from A/D converter 31, and multiplies the analog voltage by the calibration gain factor stored in flash memory 42 to measure the actual voltage across the fitting.

4. Fitting Current Measurement

An accurate fitting current measurement is needed in order to make battery capacity calculations as well as to detect a variety of errors including a rapid rise in fitting current, a rapid decrease in fitting current, or a fitting disconnection. Fitting current is calculated using the fact that current through a resistor is directly proportional to the voltage drop across it, wherein the resistor is current shunt 79, and the voltage drop is the voltage drop across shunt 79. Voltages from the load side and the ground side of shunt 79 are transmitted through wires I-SENSE-H, I-SENSE-L to current amplifier 78. The output of current amplifier 78 is then passed through a RMS-to-DC converter in order to convert the AC signal to a DC value required by A/D converter 31. This signal is then sent through multiplexer 30 to A/D converter 31. Microprocessor 15 receives the data from A/D converter 31, and multiplies the analog voltage by the calibration gain factor stored in flash memory 42 to measure the actual current through fitting 11. This method of using the voltage drop across current shunt 79 is also used to calculate current passing to batteries 113 during the charging operation (described below).

5. Temperature Measurement

Accurate temperature measurements are required in order to accurately compensate fusion times based on compensation factors specified by fitting manufacturers as well as to adjust the capacity of the batteries as they becomes less efficient at lower temperatures. The preferred embodiment of the invention includes circuitry to perform measurements from either internal temperature sensor 71 located within electrofusion system 8, or external temperature sensor 71 located near fitting 11. Microprocessor 15 selects either the internal or the external temperature measuring circuitry by setting data line SEL3 of A/D converter 31 to high or low. When data line SEL3 of A/D converter 31 is set to high, a temperature selector 80 enables the external temperature measuring circuitry, and when data line SEL3 of A/D converter 31 is set to low, temperature selector 80 enables the internal temperature measuring circuitry. Temperature is measured by calculating the resistance of thermistor 71, and using this resistance in The Steinhart and Hart equation to calculate a temperature. When microprocessor 15 selects the internal temperature sensor, microprocessor 15 measures the voltage from a voltage divider formed by a resistor 81 and the internal temperature sensor. This signal is then sent through multiplexer 30 to A/D converter 31. Microprocessor 15 receives the data from A/D converter 31 and converts that value to a voltage based on VREF of A/D converter 31. When microprocessor 15 selects the external temperature sensor, microprocessor 15 measures the voltage from a voltage divider formed by resistor 81 and the external temperature sensor. This signal is then sent through multiplexer 30 to A/D converter 31. Microprocessor 15 receives the data from A/D converter 31 and converts that value to a voltage based on VREF of A/D converter 31.

Once microprocessor 15 receives the data from A/D converter 31 and calculates the voltage drop across thermistor 71, the thermistor resistance (internal or external) is calculated as follows:

Internal Thermistor Resistance =(Voltage drop across the internal thermistor×reference resistor 81)/(VREF−Voltage drop across the internal thermistor)

External Thermistor Resistance =(Voltage drop across the external thermistor×reference resistor 81)/(VREF−Voltage drop across the external thermistor)

Microprocessor 15 multiplies the thermistor resistance by the calibration gain factor stored in flash memory 42 to measure the actual thermistor resistance. This value is then used in The Steinhart and Hart equation to calculate a temperature.

C. AC Output

This section describes a method for generating an AC voltage and current to be supplied to electrofusion fitting 11 in order to complete a thermoplastic weld. The example described herein uses a square wave output, however any output known to one of ordinary skill in the art may be used, such as, for example, a sine wave, a pseudo-sine wave, or a similar AC waveform.

The output of the electrofusion system 8 is an AC voltage because a conventional DC voltage fails to vibrate fitting 11 like the magnetic fields present in an AC voltage vibrate fitting 11. Furthermore, since all electrofusion fittings are tested for proper performance and certified with an AC voltage, the electrofusion fittings may have to be re-characterized and certified if a DC voltage were used. The AC output voltage of the present invention is provided as follows. While fusing, microprocessor 15 controls two output lines FIRE-MOSFET, FIRE1/MEAS-RES in order to establish the frequency and duty cycle of the AC output. Output lines FIRE-MOSFET, FIRE1/MEAS-RES enable an AC output driver 116 to control AC output MOSFETs 121, enabling current to flow in alternating directions through fitting 11.

When the FIRE-MOSFET output is high, AC output driver 116 energizes MOSFETs 117, 120. This permits current to flow from the positive terminal of battery pack 113, through a circuit breaker 114, on-off switch 33, MOSFET 117, the fourth terminal of output terminal 112, the left side of output cable 36, fitting 11, the right side of output cable 36, the first terminal of output terminal 112, MOSFET 120, current shunt 79, and back to the negative terminal of battery pack 113.

When the FIRE1/MEAS-RES output is high, AC output driver 116 energizes MOSFETs 118, 119. This permits current to flow from the positive terminal of battery pack 113, through circuit breaker 114, on-off switch 33, MOSFET 119, the first terminal of output terminal 112, the right side of output cable 36, fitting 11, the left side of output cable 36, the fourth terminal of output terminal 112, MOSFET 118, current shunt 79 and back to the negative terminal of battery pack 113.

By using the voltage measurement circuit described above as a feedback, microprocessor 15 times when outputs FIRE-MOSFET, FIRE1/MEAS-RES are to be turned on and off in order maintain a pre-programmed, AC voltage across fitting 11. Preferably, a 60 Hertz AC voltage is maintained across fitting 11.

D. Power Supply

While in operation, regulated DC power is required by all active components, and there are several types of regulated DC voltages generated. This section explains how these voltages are generated under normal conditions and when electrofusion system 8 is charging. The systems used for generating the various supply voltages are collectively referred to as power supply 27.

1. +5 Volt Supply

While in normal operation, the +5 volt supply is generated as follows. When on-off switch 33 is closed, current flows from the positive terminal of battery pack 113, through circuit breaker 114, on-off switch 33, the normally closed contacts of a relay 26, a diode 158 and into a +5-volt regulator 100. The output from +5-volt regulator 100 is used to power microprocessor 15, as well as other analog and digital components shown in FIGS. 3, 4 and 6.

When electrofusion system 8 is charging, the +5 volt supply is generated as follows. When the 120-volt AC source is connected, current flows through a fuse 127, and powers a transformer 92. Power is taken from a secondary winding 129 of transformer 92 and is passed through a bridge rectifier 91. The unfiltered, rectified output from bridge rectifier 91, passes through a diode 126, and energizes the coil of relay 99. When the coil energizes, the unfiltered, rectified output from bridge rectifier 91 is allowed to pass through a diode 126 into +5-volt regulator 100. The output from +5-volt regulator 100 is used to power microprocessor 15, as well as other analog and digital components shown in FIGS. 3, 4 and 6, as described above during normal operation. As soon as this +5 volt source is generated, microprocessor 15 will "boot up" and begin processing instructions.

2. −5 Volt Supply

Certain devices require a −5 volt supply both when electrofusion system 8 is operating normally and when it is charging. This −5 volt supply is generated by passing a +5 volt supply through a −5-volt regulator 102. This −5 volt supply is then used by various components shown in FIGS. 3, 4 and 6. The +5 volt supply is generated while operating normally and while charging, as described above.

3. +12 Volt Supply

AC output driver 116 requires a +12 volt supply both when electrofusion system 8 is operating normally and when it is charging. This +12 volt supply is generated by passing a +5 volt supply through a +12-volt regulator 104. This +12 volt supply is then used by AC output driver 116. The +12 volt supply is generated while operating normally and while charging, as described above.

E. Low Voltage Cutoff Circuit

In order to prevent damage to batteries 113 if on-off switch 33 is left in the on position for long period of time, a low voltage protection circuit is used to shut off power supply 27, thereby, automatically turning electrofusion system 8 off if the voltage from batteries 113 falls below a certain level.

When on-off switch 33 is closed, current flows from the positive terminal of battery pack 113 through circuit breaker 114, on-off switch 33, and into low voltage cutoff circuit 34. The current then passes through a voltage divider in order to bring the voltage down to a level compatible with low voltage detector 104.

If the voltage on the second pin of low voltage detector 104 is above a cutoff point, then the second pin of transistor 107 is pulled to +5 volts. This causes current to flow through transistor 107, bringing the fifth pin of +5-volt regulator 100 to ground. This action turns on +5-volt regulator 100, providing power to microprocessor 15, as well as other analog and digital components shown in FIGS. 3, 4 and 6.

When the voltage on the second pin of low voltage detector 104 falls below the cutoff point, the second pin of transistor 107 is pulled to ground. This causes current to stop flowing through transistor 107, bringing the fifth pin of +5-volt regulator 100 to +5 volts. This action turns off +5 volt regulator 100, removing power to microprocessor 15 and other analog and digital components shown in FIGS. 3, 4 and 6. This, in turn, causes electrofusion system 8 to turn off.

While the processor is charging, low voltage detector 104 is bypassed. Diode 105 causes the second pin of transistor 107 to be pulled to +5 volts, causing current to flow through transistor 107 and bringing the fifth pin of +5-volt regulator 100 to ground. This action turns on +5-volt regulator 100, providing power to microprocessor 15, as well as other analog and digital components shown in FIGS. 3, 4 and 6.

F. Charging Circuit

In the preferred embodiment of the invention, microprocessor 15 controls a three-phase charging cycle to fully charge batteries 113. As described above, when the 120 VAC source is connected, power supply 27 is energized, causing microprocessor 15 to "boot up" and begin executing instruction cycles. At this time a signal from a secondary winding 128 of transformer 92 is passed through a zero crossing detector 93 and a series of buffers, into microprocessor 15. Microprocessor 15 detects these signals upon starting and automatically executes the charging algorithm. Microprocessor 15 calculates the frequency of the 120 volt supply by measuring the time between zero crossing pulses, and then energizes a CHARGE-BATTERY line. The CHARGE-BATTERY signal passes through an output driver 95, energizing the coil of a charging relay 87. When the contacts of charging relay 87 close, the charging system is connected to batteries 113.

Power from secondary windings 128, 129 of transformer 92 is passed through bridge rectifiers 90, 91, respectively. The resulting, combined, rectified, unfiltered output from bridge rectifiers 90, 91 provides the power for charging batteries 113.

During the charging cycle, microprocessor 15 uses the FIRE1 output, combined with the CHARGE-BATTERY output. When the CHARGE-BATTERY output is passed through an AND gate 96 from the SCR-ON signal, which when passed through output driver 95, forms the FIRE-SCR signal to fire SCR 88. By firing SCR 88, power is transmitted from bridge rectifiers 90,91, through a diode 21 the closed contacts of charging relay 87, the CHARGER-OUTPUT line, circuit breaker 114, to the positive terminal of battery pack 113. The circuit is completed when the current is transmitted through current shunt 79 back through the CHARGER-GROUND line.

Microprocessor 15 measures battery voltage and current, using the methods described above, as feedback variables in order to control the charging cycle. The charging cycle is completed as follows:

Phase I (Constant Current)

Microprocessor 15 uses a phase angle firing technique to vary the CHARGER-OUTPUT signal in order to maintain a constant current through batteries 113. When the CHARGER-OUTPUT voltage reaches a pre-defined level, microprocessor 15 switches to Phase II;

Phase II (Constant Voltage)

Microprocessor 15 uses a phase angle firing technique in order to maintain a constant CHARGER-OUTPUT voltage. When the measured current through batteries 113 fall below a pre-determined level, microprocessor 15 switches to Phase III; and Phase III (Timed Charge)

Microprocessor 15 uses a phase angle firing technique in order to maintain a constant CHARGER-OUTPUT voltage for a predetermined amount of time. When the pre-determined time expires, the charge is complete.

After the charge, microprocessor 15 de-energizes the CHARGE-BATTERY line. This, in turn, forces output driver 95 to de-energize the coil of charging relay 87. When the contacts of charging relay 87 open, the charging system is physically disconnected from batteries 113. Also, when the CHARGE-BATTERY line is de-energized, AND gate 96 will not permit SCR 88 to be fired.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for creating an electrofusion between a plurality of thermoplastic members, wherein at least one of the members has an electrically resistive element embedded therein, the method comprising the steps of:
    providing a self contained, easy-to-use device in an enclosure comprising a battery pack, alternating current generator, voltage control and multiple output lines for connection to the electrically resistive element;
    generating an alternating current voltage from a direct current power supply by direct electronic conversion of direct current from the direct current power supply into alternating current;
    separately controlling by a programmable electronic data processing means, the polarity, level and frequency of the voltage and current in each of the output lines at a predetermined level to create an alternating current output; and
    transmitting the predetermined alternating current output to the electrically resistive element.

2. A method for creating an electrofusion between a plurality of thermoplastic members as recited in claim 1, further comprising the step of controlling the polarity, level and frequency in each of the output lines in response to measurement of at least one measurable parameter selected from the group consisting of battery voltage, output line voltage, and ambient temperature adjacent to at least one thermoplastic member having an electrically resistive element therein.

3. A method for creating an electrofusion between a plurality of thermoplastic members as recited in claim 1, wherein the polarity, level and frequency of the voltage in each output line is controlled by an electronic switch.

4. A method for creating an electrofusion between a plurality of thermoplastic members as recited in claim 1, wherein the direct current power supply comprises twenty-four two-volt batteries connected in series.

5. A self-contained, easy-to-use apparatus for creating an electrofusion between a plurality of thermoplastic members, wherein at least one of the members has an electrically resistive element embedded therein, the apparatus comprising:
    a direct current power supply including batteries;
    controllable electronic devices connected between the direct current power supply and output lines capable of being electrically connected to the electrically resistive element embedded in the thermoplastic members, said controllable electronic devices controlling the polarity, level and frequency of voltage in each of the output lines at a level determined by a programmable electronic data processing means in the apparatus; and
    at least one measurement device electrically connected to the programmable electronic data processing means providing data useable by the programmable electronic data processing means to regulate the controllable electronic devices to produce a predetermined alternating current.

6. An apparatus for creating an electrofusion between a plurality of thermoplastic members as recited in claim 5, wherein the controllable electronic devices include MOSFETs.

7. An apparatus for creating an electrofusion between a plurality of thermoplastic members as recited in claim 5, wherein the measurement device is selected from the group consisting of a device for measuring the voltage of the direct current power supply, resistance of the electrically resistive element, output voltage, output current and ambient temperature adjacent to at least one thermoplastic member having an electrically resistive element therein.

8. An apparatus for creating an electrofusion between a plurality of thermoplastic members as recited in claim 5, wherein the direct current power supply is a battery pack.

9. A method for creating an electrofusion between a plurality of thermoplastic members, wherein at least one of the members has an electrically resistive element embedded therein, the method comprising the steps of;
    identifying the thermoplastic member having the electrically resistive element embedded therein by measuring the resistance of the electrically resistive element;
    comparing the resistance to a data table;
    sorting duplicate fittings by the most frequently-used fitting;
    generating an alternating current voltage from a direct current power supply; and
    transmitting the alternating current voltage to the electrically resistive element.

10. A method for creating an electrofusion between a plurality of thermoplastic members as recited in claim 9, the method further comprising steps of:
    monitoring the progress of the electrofusion and stopping the electrofusion if errors occur; and storing electrofusion data received from the monitoring step.

11. An apparatus for creating an electrofusion between a plurality of thermoplastic members, wherein at least one of the members has an electrically resistive element embedded therein, the apparatus comprising:

means for identifying the thermoplastic member having the electrically resistive element embedded therein by measuring the resistance of the electrically resistive element;

a programmable electronic data processing means for executing programmed and logical processes and storing data, wherein the data processing means compares the resistance to a data table stored in the data processing means, and sorts duplicate fittings by the most frequently-used fitting;

means for generating an alternating current voltage from a direct current power supply; and means for transmitting the alternating current voltage to the electrically resistive element.

12. An apparatus for creating an electrofusion between a plurality of thermoplastic members as recited in claim 11, the apparatus further comprising:

means for monitoring the progress of the electrofusion and stopping the electrofusion if errors occur, wherein the electrofusion data received from the means for monitoring is stored in the data processing means.

13. A method for creating an electrofusion between a plurality of thermoplastic members, wherein at least one of the members has an electrically resistive element embedded therein, the method comprising the steps of:

identifying the thermoplastic member having the electrically resistive element embedded therein by measuring the resistance of the electrically resistive element;

comparing the resistance to a data table;

generating a voltage from a power supply; and transmitting the voltage to the electrically resistive element.

14. A method for creating an electrofusion between a plurality of thermoplastic members as recited in claim 13, the method further comprising the steps of:

monitoring the progress of the electrofusion and stopping the electrofusion if errors occur; and storing electrofusion data received from the monitoring step.

15. An apparatus for creating an electrofusion between a plurality of thermoplastic members, wherein at least one of the members has an electrically resistive element embedded therein, the apparatus comprising:

means for identifying the thermoplastic member having the electrically resistive element embedded therein by measuring the resistance of the electrically resistive element;

a programmable electronic data processing means for executing programmed arithmetic and logical processes and storing data, wherein the data processing means compares the resistance to a data table stored in the data processing means, and sorts duplicate fittings by the most frequently-used fitting;

means for generating a voltage from a power supply; and means for transmitting the voltage to the electrically resistive element.

16. An apparatus for creating an electrofusion between a plurality of thermoplastic members as recited in claim 15, the apparatus comprising:

means for monitoring the progress of the electrofusion and stopping the electrofusion if errors occur, wherein the electrofusion data received from the means for monitoring is stored in the data processing means.

17. A method for creating an electrofusion between a plurality of thermoplastic members, wherein at least one of the members has an electrically resistive element embedded therein, the method comprising the steps of:

checking that sufficient energy is available in a direct current power supply to provide enough energy to the electrically resistive element to complete the electrofusion;

preventing the electrofusion if sufficient energy is not available in the direct current power supply to complete the electrofusion;

generating an alternating current voltage from the direct current power supply if sufficient energy is available in the direct current power supply to complete the electrofusion; and transmitting the alternating current voltage to the electrically resistive element if sufficient energy is available in the direct current power supply to complete the electrofusion.

18. An apparatus for creating an electrofusion between a plurality of thermoplastic members, wherein at least one of the members has an electrically resistive element embedded therein, the apparatus comprising:

a programmable electronic data processing means for executing programmed arithmetic and logical processes and storing data, wherein the data processing means checks that sufficient energy is available in a direct current power supply to provide enough energy to the electrically resistive element to complete the electrofusion;

means for preventing the electrofusion if sufficient energy is not available in the direct current power supply to complete the electrofusion;

means for generating an alternating current voltage from the direct current power supply if sufficient energy is available in the direct current power supply to complete the electrofusion; and means for transmitting the alternating current voltage to the electrically resistive element if sufficient energy is available in the direct current power supply to complete the electrofusion.

19. A method for creating an electrofusion between a plurality of thermoplastic members, wherein at least one of the members has an electrically resistive element embedded therein, the method comprising the steps of:

checking that sufficient energy is available in a power supply to provide enough energy to the electrically resistive element to complete the electrofusion;

preventing the electrofusion if sufficient energy is not available in the power supply to complete the electrofusion;

generating a voltage from the power supply if sufficient energy is available in the power supply to complete the electrofusion; and transmitting the voltage to the electrically resistive element if sufficient energy is available in the power supply to complete the electrofusion.

20. An apparatus for creating an electrofusion between a plurality of thermoplastic members, wherein at least one of the members has an electrically resistive element embedded therein, the apparatus comprising:

a programmable electronic data processing means for executing programmed arithmetic and logical processes and storing data, wherein the data processing means checks that sufficient energy is available in a power supply to provide enough energy to the electrically resistive element to complete the electrofusion;

preventing the electrofusion if sufficient energy is not available in the power supply to complete the electrofusion;

means for generating a voltage from the power supply if sufficient energy is available in the power supply to complete the electrofusion; and means for transmitting the voltage to the electrically resistive element if sufficient energy is available in the power supply to complete the electrofusion.

\* \* \* \* \*